United States Patent
Kuwahara

(10) Patent No.: US 11,750,443 B2
(45) Date of Patent: Sep. 5, 2023

(54) SYSTEM CONFIGURATION DERIVATION DEVICE, METHOD, AND COMPUTER-READABLE RECORDING MEDIUM

(71) Applicant: NEC Corporation, Tokyo (JP)

(72) Inventor: Takuya Kuwahara, Tokyo (JP)

(73) Assignee: NEC CORPORATION, Tokyo (JP)

(*) Notice: Subject to any disclaimer, the term of this patent is extended or adjusted under 35 U.S.C. 154(b) by 0 days.

(21) Appl. No.: 17/181,681

(22) Filed: Feb. 22, 2021

(65) Prior Publication Data

US 2021/0266218 A1      Aug. 26, 2021

(30) Foreign Application Priority Data

Feb. 26, 2020   (JP) ................... 2020-030013

(51) Int. Cl.
  *G06F 15/16*   (2006.01)
  *H04L 41/0803*   (2022.01)

(52) U.S. Cl.
  CPC .................. *H04L 41/0803* (2013.01)

(58) Field of Classification Search
  CPC .............. H04I 41/0883; H04I 41/0876; H04I 41/0843; H04L 41/0803; H04L 41/0843; H04L 41/0894
  (Continued)

(56) References Cited

U.S. PATENT DOCUMENTS

| 2002/0016955 A1* | 2/2002 | Matsuo | G06F 8/20 |
| | | | 717/106 |
| 2008/0162107 A1* | 7/2008 | Aniszczyk | G06F 8/65 |
| | | | 703/21 |

(Continued)

FOREIGN PATENT DOCUMENTS

| WO | 2015/162889 A1 | 10/2015 |
| WO | 2019/216082 A1 | 11/2019 |

OTHER PUBLICATIONS

P. Rosenberger et al., "Benchmarking and Functional Decomposition of Automotive Lidar Sensor Models," 2019 IEEE Intelligent Vehicles Symposium (IV), Paris, France, 2019, pp. 632-639 (Year: 2019).*

(Continued)

*Primary Examiner* — Oscar A Louie
*Assistant Examiner* — Messeret F Gebre
(74) *Attorney, Agent, or Firm* — Sughrue Mion, PLLC

(57) ABSTRACT

Provided is a system configuration derivation device which, when given an abstract configuration, and quantitative requirements in which some numerical values are undetermined, is capable of outputting a concrete system configuration concretizing the abstract configuration, the concrete system configuration meets quantitative requirements representing conditions and the like necessary for the operation of a desired system and including given quantitative requirements. The configuration information concretizing unit 301 obtains as input an abstract configuration, which is information indicating a system configuration in which an undetermined part exists, and quantitative requirements, which are numerical requirements required for a system, and in which some numerical values are undetermined. The configuration information concretizing unit 301 outputs a concrete configuration, which is information indicating the system configuration in which an undetermined part does not exist, and which meets the quantitative requirements.

4 Claims, 16 Drawing Sheets

(58) Field of Classification Search
USPC .......................................................... 709/221
See application file for complete search history.

(56) References Cited

U.S. PATENT DOCUMENTS

| | | | | |
|---|---|---|---|---|
| 2010/0332444 | A1* | 12/2010 | Akatsu | G06N 5/025 706/54 |
| 2011/0218793 | A1* | 9/2011 | Chockier | G06F 9/44 703/20 |
| 2015/0277940 | A1* | 10/2015 | Soejima | G06F 9/54 713/100 |
| 2017/0147715 | A1 | 5/2017 | Izukura | |

OTHER PUBLICATIONS

De Vries, B., van den Tillaart, J., Slager, K., Vreenegoor, R., & Jessurun, J. (2012). Creating 3D models from sketch plans for spatial landscape evaluation. International Journal of E-Planning Research, 1(1), 42-55. (Year: 2012).*

U. Glasser, Y. Gurevich and M. Veanes, "Abstract communication model for distributed systems," in IEEE Transactions on Software Engineering, vol. 30, No. 7, pp. 458-472, Jul. 2004 (Year: 2004).*

Takayuki Kuroda and 3 others, "Search-based network design generation scheme for closed-loop automation of network operations", IEICE Technical Report, The Institute of Electronics, Information and Communication Engineers, vol. 118, No. 118, ICM2018-11, pp. 1-6, Jul. 2018, Japan.

* cited by examiner

FIG. 1
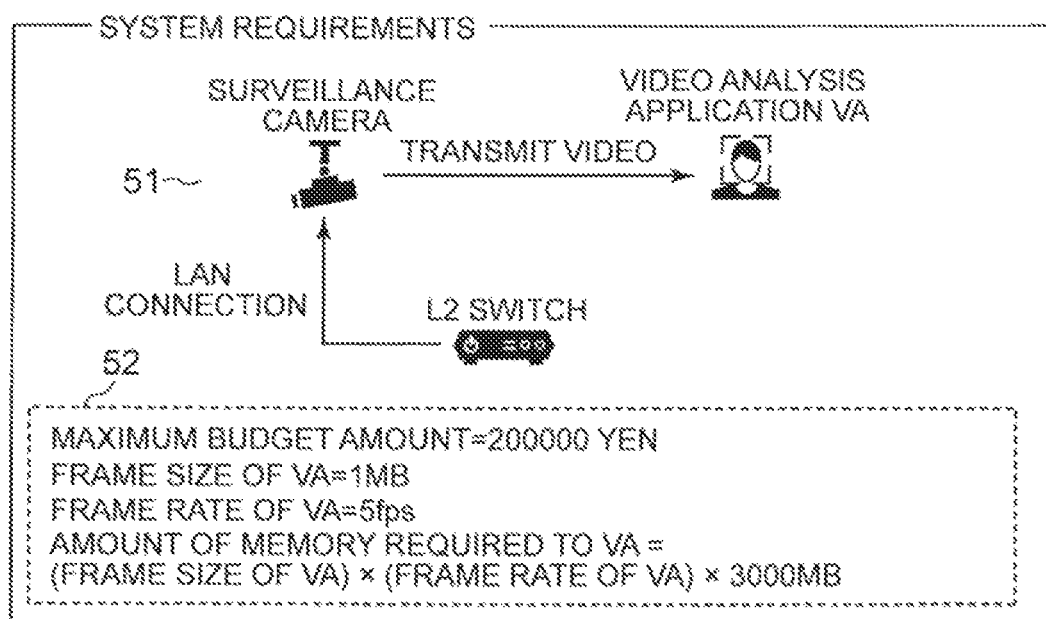
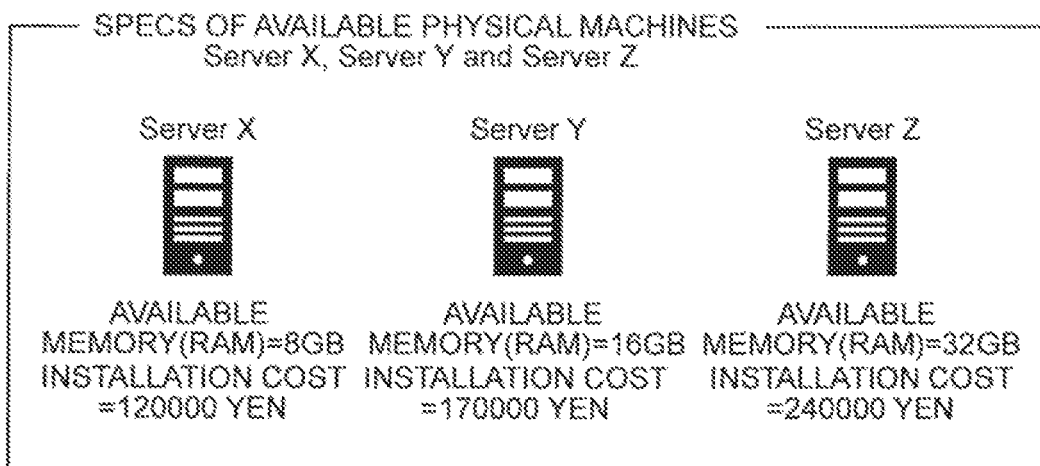

FIG. 6

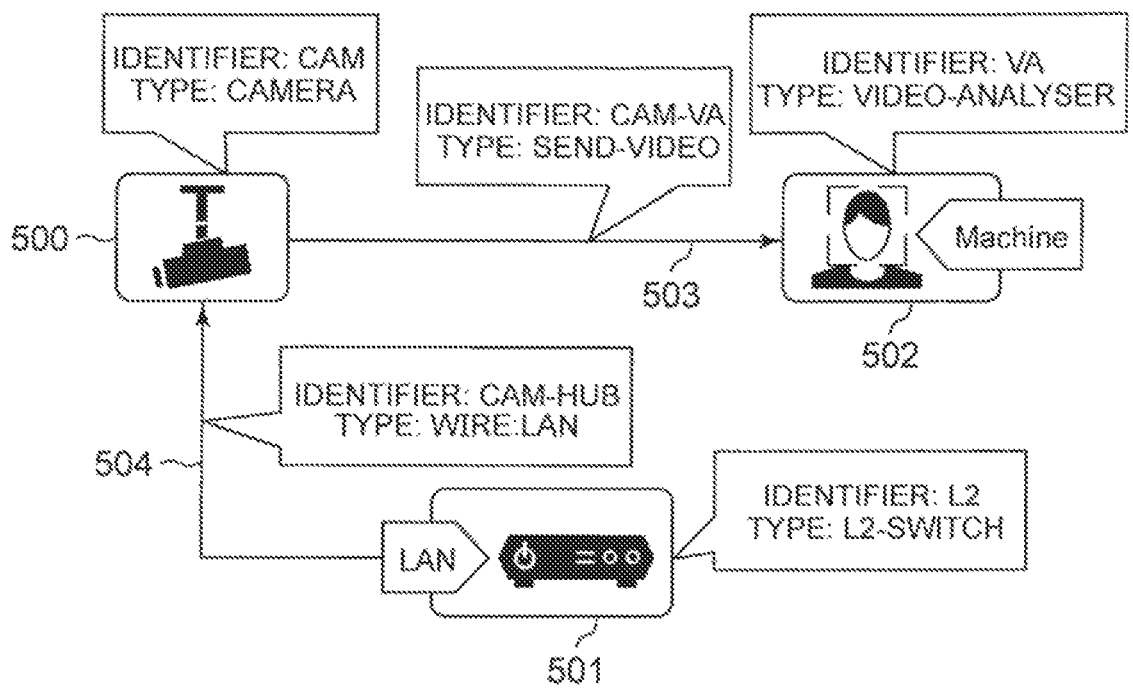

FIG. 7

QUANTITATIVE REQUIREMENTS

| USED VARIABLES LIST | CONSTRAINT EXPRESSIONS LIST |
|---|---|
| System.CAPEX<br>VA.FrameSize<br>VA.FrameRate<br>VA.Memory<br>ServerY.MemoryLimit<br>ServerY.Memory<br>ServerY.Price | sum(System.CAPEX) ≤ 200000<br>VA.FrameSize = 1<br>VA.Memory = VA.FrameSize × VA.FrameRate × 3000<br>ServerY.MemoryLimit = 16000<br>ServerY.Price = 170000<br>VA.Memory ∈ ServerY.Memory<br>sum(ServerY.Memory) ≤ ServerY.MemoryLimit<br>ServerY.Price ∈ System.CAPEX |

SYSTEM CONFIGURATION DERIVATION DEVICE, METHOD, AND COMPUTER-READABLE RECORDING MEDIUM

INCORPORATION BY REFERENCE

This application is based upon and claims the benefit of priority from Japanese patent application No. 2020-030013, filed on Feb. 26, 2020, the disclosure of which is incorporated herein in its entirety by reference.

TECHNICAL FIELD

This invention relates to a system configuration derivation device, a system configuration derivation method, and a computer-readable recording medium in which a system configuration derivation program is recorded.

BACKGROUND ART

Work required when building an Information and Communication Technology (ICT) system (hereafter simply referred to as system) for the purpose of service operations and the like includes system configuration design work and deployment procedures design work.

The requirements for a desired system are referred to as system requirements. The components of the system and their connection relationships are collectively referred to as the system configuration.

The system configuration design work requires that the system configuration required to meet the system requirements is constructed without shortage, and that all the necessary settings must be set correctly for the entire system to work properly. This is a very labor-intensive task in some cases.

Automatic design techniques automate the process of concretizing system requirements to system configuration. In general, automatic design techniques are often narrows down the design target to a specific domain of the system and perform automatic design by solving some kind of optimization problem. Examples of specific domains of the system include, for example, network paths and placement of computational resources and the like.

Research is also underway on techniques for dealing with generic descriptions of system requirements. NPL 1 describes a technique for automatically deriving a system configuration based on a system requirement described using a generic model. According to the technique described in NPL 1, it is possible to automatically design a system with generic and multifaceted system requirements as input by preparing the necessary models.

In system requirements that can be described by the generic model described in NPL 1, functions and devices such as components are represented as nodes and the relationships between the nodes are specified by a graphical representation with edges (directed edges). For example, a system requirement that "Transmission Control Protocol (TCP) communication is possible between two servers" results in a graph in which the nodes corresponding to each server are connected by an edge representing "TCP communication possible". The technique described in NPL 1, for example, automatically derives a way to concretize the TCP communication represented by this graph.

The techniques described in NPL 1 are capable of servicing models of components of a system and extending the set of serviced models of components of the system as needed. The techniques described in NPL 1 select the required system components from the set of serviced models of the components of the system and represent the system requirements obtained by combining the components by a general attributed graph representation. Predefined rules are applied to the attributed graph and the attributed graph is rewritten.

PTL 1 describes a system configuration derivation device that outputs a design result of a configuration in which all undetermined parts are determined by selecting a rewriting rule applicable to a base configuration including undetermined parts and repeating attempts to apply the selected rule. PTL 1 also describes the system configuration derivation device having a function to convert an input abstract configuration into concrete system configuration information.

PTL 2 describes a design support device that can automatically and efficiently derive candidates of system configurations that satisfy specified non-functional requirements while taking into account various factors that affect non-functional requirements.

CITATION LIST

Patent Literature

PTL 1: International Publication No. 2019/216082
PTL 2: International Publication No. 2015/162889

Non-Patent Literature

NPL 1
Takayuki Kuroda and 3 others, "Search-based network design generation scheme for closed-loop automation of network operations", IEICE Technical Report, The Institute of Electronics, Information and Communication Engineers, vol. 118, no. 118, ICM2018-11, pp. 1-6, July 2018.

SUMMARY

Information indicating a system configuration in which an undetermined part exists is called an abstract configuration. An example of an abstract configuration is a system configuration in which an application is shown but not the device on which the application is deployed, and so on.

Among the system requirements, numerical requirements are referred to as quantitative requirements. Examples of quantitative requirements include, for example, "required machine specs," "required network bandwidth," "amount of memory resources required," "budget limit," etc. These are examples only, and quantitative requirements are not limited to these examples.

An example object of the invention is to provide a system configuration derivation device, a configuration derivation method, and a computer-readable recording medium recording a system configuration derivation program, which, when given an abstract configuration, and quantitative requirements in which some numerical values are undetermined, is capable of outputting a concrete system configuration concretizing the abstract configuration, the concrete system configuration meets quantitative requirements representing conditions and the like necessary for the operation of a desired system and including given quantitative requirements.

A system configuration derivation device according to an example aspect of the invention is configured to: obtain as input an abstract configuration, which is information indicating a system configuration in which an undetermined part exists, and quantitative requirements, which are numerical requirements required for a system, and in which some numerical values are undetermined; and output a concrete configuration, which is information indicating the system configuration in which an undetermined part does not exist, and which meets the quantitative requirements.

A system configuration derivation method according to an example aspect of the invention comprises obtaining as input an abstract configuration, which is information indicating a system configuration in which an undetermined part exists, and quantitative requirements, which are numerical requirements required for a system, and in which some numerical values are undetermined, and outputting a concrete configuration, which is information indicating the system configuration in which an undetermined part does not exist, and which meets the quantitative requirements.

A computer-readable recording medium according to an example aspect of the invention is a non-transitory computer-readable recording medium in which a system configuration derivation program is recorded, the system configuration derivation program causing a computer to execute: a configuration information concretizing process of obtaining as input an abstract configuration, which is information indicating a system configuration in which an undetermined part exists, and quantitative requirements, which are numerical requirements required for a system, and in which some numerical values are undetermined, and outputting a concrete configuration, which is information indicating the system configuration in which an undetermined part does not exist, and which meets the quantitative requirements.

BRIEF DESCRIPTION OF THE DRAWINGS

FIG. 1 It depicts a schematic diagram showing an example of system requirements.

FIG. 6 It depicts a schematic diagram showing an example of an abstract configuration.

FIG. 7 It depicts an illustration showing an example of quantitative requirements.

EXAMPLE EMBODIMENT

Before describing example embodiments of the invention, first, example of a concrete system configuration in case an abstract configuration and quantitative requirements where all the numerical values are determined are given is described. It can be said that the abstract configuration and the quantitative requirements are combined to form the system requirements.

FIG. 1 is a schematic diagram showing an example of system requirements. The system requirements shown in FIG. 1 include an abstract configuration 51 and a quantitative requirement 52. In the abstract configuration 51, for example, the physical machine to deploy the video analysis application (represented by the sign VA) is not yet determined, and no such physical machine is shown in the abstract configuration 51. FIG. 1 also illustrates three candidates of physical machine (ServerX, ServerY, and ServerZ) to deploy the video analysis application VA.

A designer inputs the system requirements shown in FIG. 1 is going to introduce a new video analysis application VA to analyze the video from surveillance cameras in a store and detect anomalies. The video analysis application VA can be configured with "frame size (MB)" and "frame rate (fps)" as parameters. The value of frame size and frame rate are defined in the quantitative requirements 52 as 1 MB and 5 fps, respectively. The amount of memory required to run the video analysis application VA is estimated as "frame size× frame rate×3000 (MB)", which is also defined in the quantitative requirements 52. The quantitative requirement 52 also defines the maximum budget amount. In this example, there are no undetermined numerical values in quantitative requirement 52.

Figure 2:
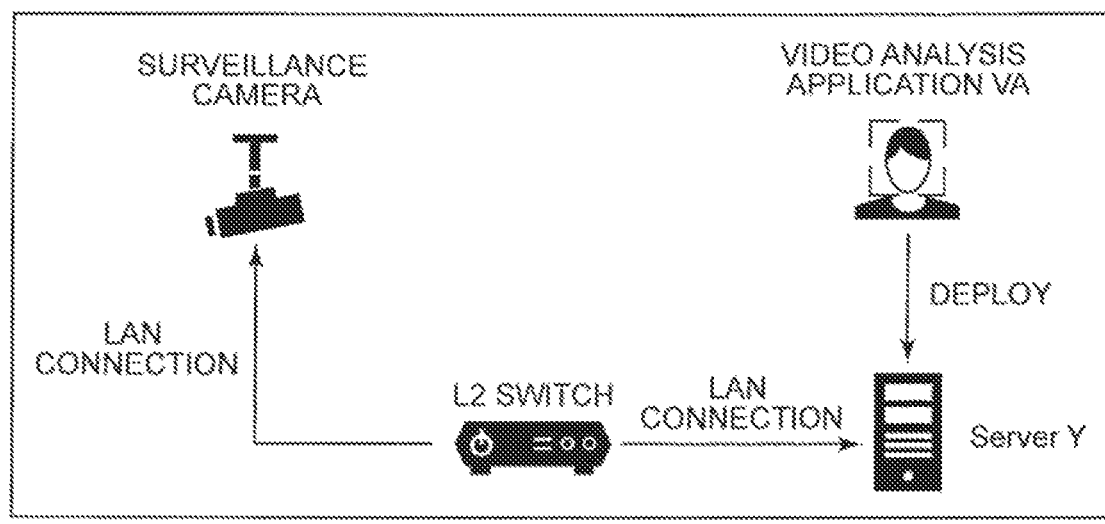
FIG. 2 It depicts a schematic diagram showing an example of a concrete system configuration that meets the system requirements.

FIG. 2 is a schematic diagram showing the configuration of a video analysis application VA deployed to a physical machine ServerY. The configuration shown in FIG. 2 is a concrete system configuration that meets the system requirements shown in FIG. 1. As shown in FIG. 1, 16 GB of memory is available in the physical machine ServerY, and the total cost is 170,000 yen. Therefore, the system configuration shown in FIG. 2 meets all the specified quantitative requirements 52 and the quantitative constraints on the resources that the video analysis application VA has.

Figure 3:
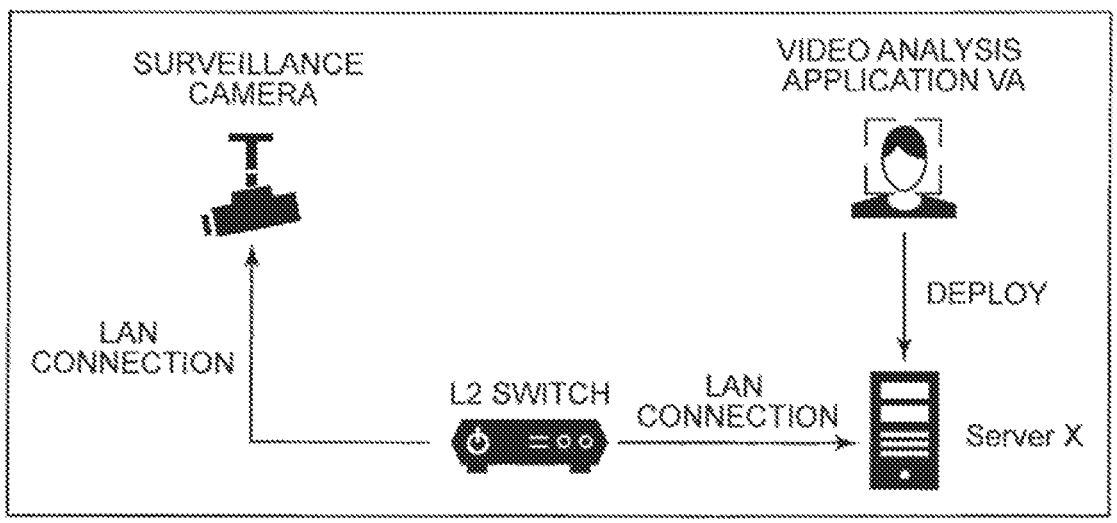
FIG. 3 It depicts a schematic diagram showing an example of a system configuration that does not meet the quantitative requirements.
Figure 4:
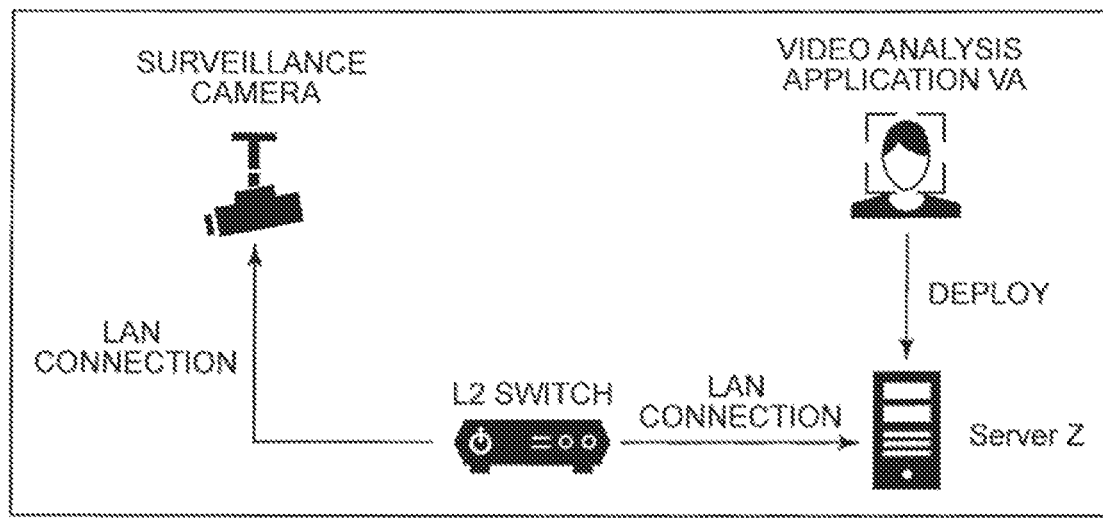
FIG. 4 It depicts a schematic diagram showing an example of a system configuration that does not meet the quantitative requirements.

FIGS. 3 and 4 are schematic diagrams showing examples of system configurations that do not meet the quantitative requirements. FIG. 3 shows a configuration in which the video analysis application VA is deployed to the physical machine ServerX. The available memory in the physical machine ServerX is only 8 GB, and the video analysis application VA does not work properly in the configuration shown in FIG. 3. Moreover, FIG. 4 shows a configuration in which the video analysis application VA is deployed to physical machine ServerZ. Since the physical machine ServerZ can use 32 GB of memory, the video analysis application VA works normally. However, the total cost is 240,000 yen, and it does not meet the maximum budget amount "200,000 yen" specified in the quantitative requirement 52.

To achieve the above quantitative requirements by rewriting the graph by rules, as in the method described in NPL 1, a method using conditioning on attributes is considered. Nodes and edges of a graph (nodes and edges are collectively referred to as "entities") are labeled with numerical values as attributes. The idea of the above method is to use this to specify quantitative requirements and to derive configurations that satisfy the quantitative requirements by means of rules that refer to them.

For example, in the system requirements described in FIG. 1, based on the requirements of "frame size 1 MB" and "frame rate 5 fps" specified for video analysis application VA, the amount of memory required can be estimated as 1 (MB)×5 (fps)×3000=15000 (MB)=15 (GB).

And suppose the rules for deploying the video analysis application VA to three candidates of physical machines (ServerX, ServerY and ServerZ) are specified as follows.

(a) "Deploy the video analysis application VA on the physical machine ServerX if the required memory of the video analysis application VA is less than or equal to 8 GB and the available budget is more than or equal to 120,000 yen."

(b) "Deploy the video analysis application VA on the physical machine ServerY if the required memory of the video analysis application VA is less than or equal to 16 GB and the available budget is more than or equal to 170,000 yen."

(c) "Deploy the video analysis application VA on the physical machine ServerZ if the required memory of the video analysis application VA is less than or equal to 32 GB and the available budget is more than or equal to 240,000 yen."

If the rules are specified as above, the system requirements shown in FIG. 1 can be concretized.

However, the above-mentioned method of concretization has the problem that concretization does not proceed when some values are undetermined in the quantitative requirements. For example, if the values "frame size 1 MB" and "frame rate 5 fps" were not specified in the quantitative requirements 52 shown in FIG. 1, the amount of memory required for the video analysis application VA cannot be estimated. As a result, it cannot be determined which of the three candidates of the physical machine the video analysis application VA should be deployed to. In such a case, concretization can proceed by setting an appropriate value for an undetermined value. However, since there are innumerable combinations of possible combinations of frame size and frame rate values, it is not practical to proceed with an exhaustive concretization of each combination.

Such problems make it difficult in general technology to concretize an abstract configuration, when given quantitative requirements, where some numerical values are undetermined.

However, trying to meet the quantitative requirements is requested in most cases of real-world system design.

The system configuration derivation device of each example embodiment of the present invention, when given an abstract configuration, and quantitative requirements in which some numerical values are undetermined, can output a concrete system configuration concretizing the abstract configuration, the concrete system configuration meets quantitative requirements representing conditions and the like necessary for the operation of a desired system and including given quantitative requirements. Hereinafter, example embodiments of the present invention will be described with reference to the drawings.

Example Embodiment 1

Figure 5:
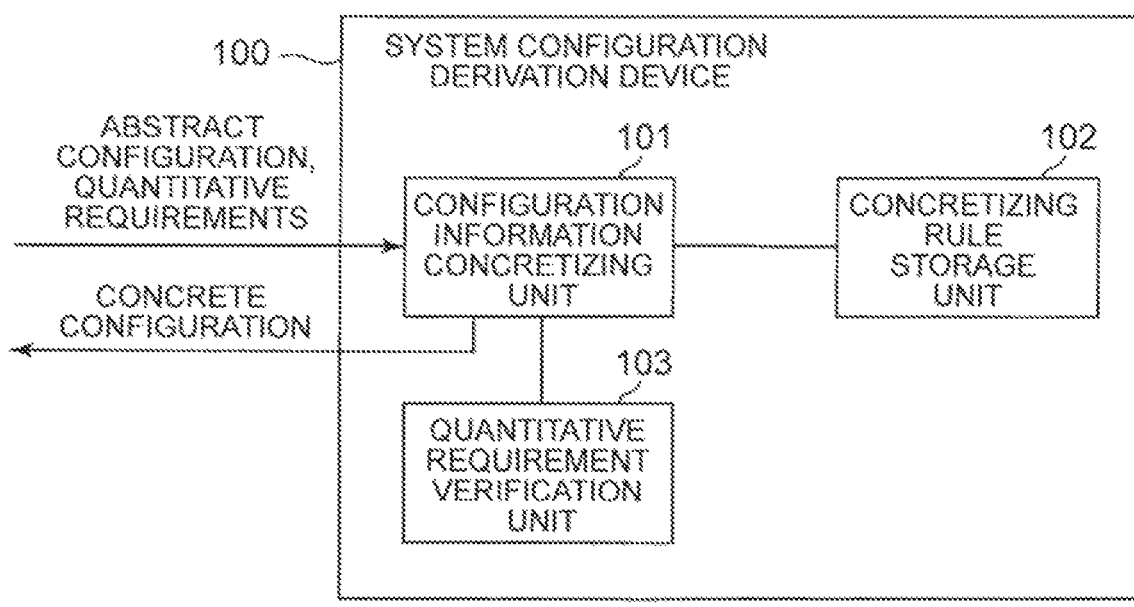
FIG. 5 It depicts a block diagram showing an example configuration of a system configuration derivation device of the first example embodiment of the present invention.

FIG. 5 is a block diagram showing an example configuration of a system configuration derivation device of a first example embodiment of the present invention. The system configuration derivation device 100 of the first example embodiment comprises a configuration information concretizing unit 101, a concretizing rule storage unit 102, and a quantitative requirement verification unit 103.

The configuration information concretizing unit 101 receives as input an abstract configuration and quantitative requirements in which some numerical values are undetermined, derives a concrete configuration by sequentially applying concretizing rules to the abstract configuration and the quantitative requirements, and outputs the concrete configuration. The concrete configuration is information that indicates a system configuration in which an undetermined part does not exist. The concrete configuration, which is derived by the configuration information concretizing unit 101, meets the quantitative requirements.

Also, concretizing rules are rules that specify how to concretize an abstract configuration and update the quantitative requirements.

The concretizing rules storage unit 102 is a storage unit that stores the above concretizing rules in advance.

As described below, the quantitative requirements are expressed using variables. When the quantitative requirement verification unit 103 receives the quantitative requirements from the configuration information concretizing unit 101, the quantitative requirement verification unit 103 verifies whether or not there is a value assignment to variables that meets the quantitative requirement, and returns the verification results.

The configuration information concretizing unit 101 and the quantitative requirement verification unit 103 are realized, for example, by a CPU (Central Processing Unit) of a computer operating in accordance with a system configuration derivation program. For example, the CPU may read a system configuration derivation program from a program recording medium, such as a program storage device of the computer, and operate as the configuration information concretizing unit 101 and the quantitative requirement verification unit 103 in accordance with the system configuration derivation program. The concretizing rule storage unit 102 is realized, for example, by a storage device provided by the computer.

The following describes the abstract configuration and its data structure in this example embodiment. An abstract configuration is information that indicates a system configuration in which there is a undetermined part of configuration and setting. It can be said that the abstract configuration defines information that represents "what requirements the system should meet and what functions the system should have" without specifically referring to the details of the system.

The basic structure of the abstract configuration is a graph with "nodes" that correspond to the functional, logical and physical components of the system and "edges" that represent the relationship between those two nodes by connecting them. Edges have a direction, and for an edge from node A to node B, node A is referred the "connection source" and node B is referred the "connection destination". When nodes and edges are referred to indistinguishably, nodes and edges are referred collectively as "entities".

An entity has an "identifier" to uniquely identify the entity in the whole system and "type information" to express what concept the entity corresponds to. In addition to these, a node may also have information indicating the "requested part". A node may have a plurality of pieces of information indicating the "requested part" or may not have any information indicating the "requested part" at all.

FIG. 6 is a schematic diagram showing an example of an abstract configuration. In the example shown in FIG. 6, nodes 500, 501, 502 are represented by rounded rectangles containing icons. Edges 503, 504 are represented by arrows connecting the nodes to each other. Each entity is accompanied by a callout. In the callout, entity identifiers and entity type information are described. To simplify the drawing, illustrations of entity callouts may be omitted.

Node 500 represents a network camera and node 501 represents an L2 (Layer 2) switch. Both of these nodes 500, 501 correspond to the concrete components of a system that does not contain any undetermined parts.

Node 501 is labeled with a pentagon label described as "LAN (Local Area Network)". This label is information that indicates the components that the node is requesting, and in this example, it indicates that node 501 is requesting LAN. Specifically, the label expresses the request that the node 501 needs to be connected to the communication destination by a physical LAN cable in order to use the L2 switch function. Edge 504 is one of the edges that responds to this request, and with edge 504, the "LAN" request of node 501 is satisfied.

Node 502 represents a video analysis application. Node 502 is labeled with a label described as "Machine". This label expresses the requirement that a physical machine is required for the video analysis application to work. To satisfy this requirement, an edge of WIRE:Machine type needs to be created from node 502 to a node with MACHINE type (or a MACHINE-detailed type). In the example shown in FIG. 6, the "Machine" request of node 502 is not met. In this respect, there is an undetermined part.

Edge 503 means that the source node 500 transmits the acquired video data to the destination node 502. Unlike edge 504, edge 503 is an abstract edge whose realization method is undetermined. Therefore, edge 503 also corresponds to the undetermined part.

As can be seen from the above description, the abstract configuration exemplified in FIG. 6 is information that represents a "system for analyzing video captured by a network camera", some parts of which remains undetermined.

The quantitative requirements in this example embodiment will be described below. The quantitative requirements are correlated to the abstract configuration and are input to the configuration information concretizing unit 101. Therefore, the quantitative requirements are always correlated to the abstract configuration.

The quantitative requirements also include a "used variables list" and a "constraint expressions list".

A used variable list of quantitative requirements is a list of the variable names of all the variables used in the constraint expressions list described below. Each variable name in the used variables list is a string. The string that serves as the variable name contains an identifier and type information of the entity in the abstract configuration correlated to the quantitative requirements. The string often represents the performance and cost of the entities.

A constraint expressions list of quantitative requirements is a list of inter-variable constraints expressed in an expression. The variables used in each expression contained in this list are listed in the used variables list. Each constraint contained in the constraint expressions list must be uniquely true or false depending on the value of the variable.

FIG. 7 is an illustration showing an example of quantitative requirements. The quantitative requirements illustrated in FIG. 7 are the quantitative requirements imposed on the configuration shown in FIG. 2.

The used variables list, shown in FIG. 7, includes the following seven variables.

"System. CAPEX"
"VA.FrameSize"
"VA.FrameRate"
"VA.Memory"
"ServerY.MemoryLimit"
"ServerY.Memory"
"ServerY.Price"

"System.CAPEX" means "the set of consumed budgets".
"VA.FrameSize" means "the value of the frame size of the video analysis application VA".
"VA.FrameRate" means "the value of the frame rate of the video analysis application VA".
"VA.Memory" means "the value of memory consumption of the video analysis application VA".
"ServerY.MemoryLimit" means "the memory upper limit of the physical machine ServerY".
"ServerY.Memory" means "the set of memory of the physical machine ServerY being consumed".
"ServerY.Price" means "the value of the price of the physical machine ServerY".

As mentioned above, the variables in the used variables list include variables meaning "numeric" and variables meaning "set". In other words, there are two types of variables: "numeric-type variables with numeric as values" and "set-type variables with a set of numeric-type variables as values".

The constraint expressions list shown in FIG. 7 contains the following eight constraint expressions.

"sum(System.CAPEX)≤200000"
"VA.FrameSize=1"
"VA.Memory=VA.FrameSize×VA.FrameRate×3000"
"ServerY.MemoryLimit=16000"
"ServerY.Price=170000"
"VA.Memory∈ServerY.Memory"
"sum(ServerY.Memory)≤ServerY.MemoryLimit"
"ServerY.Price∈System.CAPEX"

Here, equality sign (=), inequality sign (≤), affiliation (∈), etc. are interpreted as binary relations of general meaning.

Also, "sum" represents the sum of the values of the variables belonging to the set.

"sum(System.CAPEX)≤200000" indicates that "the sum of the values of the variables belonging to 'the set of consumed budgets' is less than or equal to 200000".

"VA.FrameSize=1" indicates that "'the value of the frame size of the video analysis application VA' is 1".

"VA.Memory=VA.FrameSize×VA.FrameRate×3000" indicates that "'the value of memory consumption of the video analysis application VA' is the product of 'the value of the frame size of the video analysis application VA' and 'the value of the frame rate of the video analysis application VA' multiplied by 3000".

"ServerY.MemoryLimit=16000" indicates that "'the memory upper limit of the physical machine ServerY' is 16000".

"ServerY.Price=170000" indicates that "'the value of the price of the physical machine ServerY' is 170000".

"VA.Memory∈ServerY.Memory" indicates that "'the set of memory of the physical machine ServerY being consumed' contains the variable VA.Memory".

"sum(ServerY.Memory)≤ServerY.MemoryLimit" indicates that "the sum of the values of the variables belonging to 'the set of memory of the physical machine ServerY being consumed' is less than or equal to 'the memory upper limit of the physical machine ServerY'".

"ServerY Price∈System.CAPEX" indicates that "'the set of consumed budgets' contains the variable ServerY.Price".

In the quantitative requirements illustrated in FIG. 7, for example, the value of the variable "VA.FrameRate" and the value of the variable "VA.Memory" are undetermined. That is, in the quantitative requirements illustrated in FIG. 7, some numerical values are undetermined.

The constraint expressions list includes not only constraint expressions for numeric values, but also constraint expressions for the elements included in the set. The constraint expressions for elements included in the set are called set-type constraints. The constraint expressions for numeric values are called numeric-type constraints.

There are two types of set-type constraints: constraints of the form "e∈S", which indicate that "S includes the variable e", and constraints of the form "S1⊆S2", which indicate that "all the elements included in S1 are included in S2". The former is called the "affiliation constraint" and the latter is called the "inclusion constraint".

The above is an explanation of the quantitative requirements with concrete examples.

When all variables in quantitative requirements are assigned a value, the truth of false of each constraint expression in the constraint expressions list is determined. That the assignment of values (denoted by the sign M) to the variables included in the used variables list in the quantitative requirements meets all the constraint expressions in the constraint expressions list is said as "Value assignment M satisfies the quantitative requirements". The quantitative requirements are said to be satisfiable if there is any one value assignment that satisfies the quantitative requirements. If there is no value assignment to satisfy the quantitative requirements, the quantitative requirement is said to be "unsatisfiable". However, when determining the truth or false about set-type constraints, care should be taken as explained below.

As mentioned earlier, there are two types of variables used in quantitative requirements: numeric-type variables and set-type variables. And for set-type variables, there are two types of constraint expressions: affiliation constraints (∈) and inclusion constraints (⊆). In each example embodiment of the present invention, the set-type constraints are interpreted based on the Closed World Assumption (CWA).

"Interpretation of constraints based on Closed World Assumption" is explained below with a concrete example. Suppose there is a constraint SC on a set-type variable. Then suppose that the constraint SC="x∈A, y∈B, A⊆B". This constraint SC means: "A includes x as an element", "B includes y as an element", and "B includes all elements of A as elements". For example, the assignment of value "A={x}, B={x,y}" is an assignment by which all constraint expressions in the constraint SC are determined to be true. In general, not only the above assignment, but also value assignment such as "A={x,y}, B={x,y}" determines all constraint expressions in the constraint SC to be true.

However, the assignment "A={x,y}, B={x,y}" includes the affiliation relationship "A includes y as an element". This affiliation relationship cannot be deduced from the fact "A includes x as an element", "B includes y as an element", and "B includes all elements of A as elements" indicated by constraint SC. Interpreting constraint SC on the basis of Closed World Assumption means that there is no "affiliation relationship that cannot be deduced from constraint SC" as described above. In the above example, due to the fact that the constraint SC cannot deduce the affiliation relationship "y∈A", the constraint with the negation of "y∈A" added explicitly to constraint SC is constraint SC interpreted based on Closed World Assumption. That is, if the constraint SC is interpreted based on Closed World Assumption, the only value assignment that satisfies the constraint SC is "A={x}, B={x,y}".

Concrete examples of the assignment M of values to variables, and the satisfiability of the quantitative requirements are described below.

Suppose that with respect to the quantitative requirements shown in FIG. 7, the following value assignment M is set.
System.CAPEX={ServerY.Price}
VA.FrameSize=1
VA.FrameRate=5
VA.Memory=15000
ServerY.MemoryLimit=16000
ServerY.Memory={VA.Memory}
ServerY.Price=170000

The above value assignment M satisfies all the constraint expressions included in the constraint expressions list shown in FIG. 7. That is, the above value assignment M satisfies the quantitative requirements shown in FIG. 7. Therefore, the quantitative requirements shown in FIG. 7 are quantitative requirements that can be satisfiable.

Here, it should be noted that in the above value assignment M, the value of the variable System.CAPEX is {ServerY.Price}, not {170000}. That is, the value of a set-type variable is only a set of variables, not an assigned value of the variable. For example, suppose there is a variable S whose value is a set including numeric-type variables x, y. In this case, even if x=10 and y=10, the value of S is {x,y}, and the value of S cannot be combined into a single element of {10}.

Note that the above value assignment M is mere one of the value assignments that satisfies the quantitative requirements shown in FIG. 7. For example, the value assignment shown below also satisfies the quantitative requirements shown in FIG. 7.
System.CAPEX={ServerY.Price}
VA.FrameSize=1
VA.FrameRate=4

VA.Memory=12000
ServerY.MemoryLimit=16000
ServerY.Memory={VA.Memory}
ServerY.Price=170000

Also, the value assignment shown below is an example of value assignment that does not meet the quantitative requirements shown in FIG. 7.

System.CAPEX={ServerY.Price}
VA.FrameSize=1
VA.FrameRate=6
VA.Memory=18000
ServerY.MemoryLimit=16000
ServerY.Memory={VA.Memory}
ServerY.Price=170000

Suppose there are quantitative requirements (let a) with the first constraint expression "sum(System.CAPEX)≤200000" in the constraint expressions list shown in FIG. 7 replaced by "sum(System.CAPEX)≤100000". There is no value assignment that satisfies this quantitative requirements a. Therefore, the quantitative requirements a are unsatisfiable quantitative requirements.

The above is a description of concrete examples of the assignment M of values to variables, and the satisfiability of the quantitative requirements.

Figure 8:
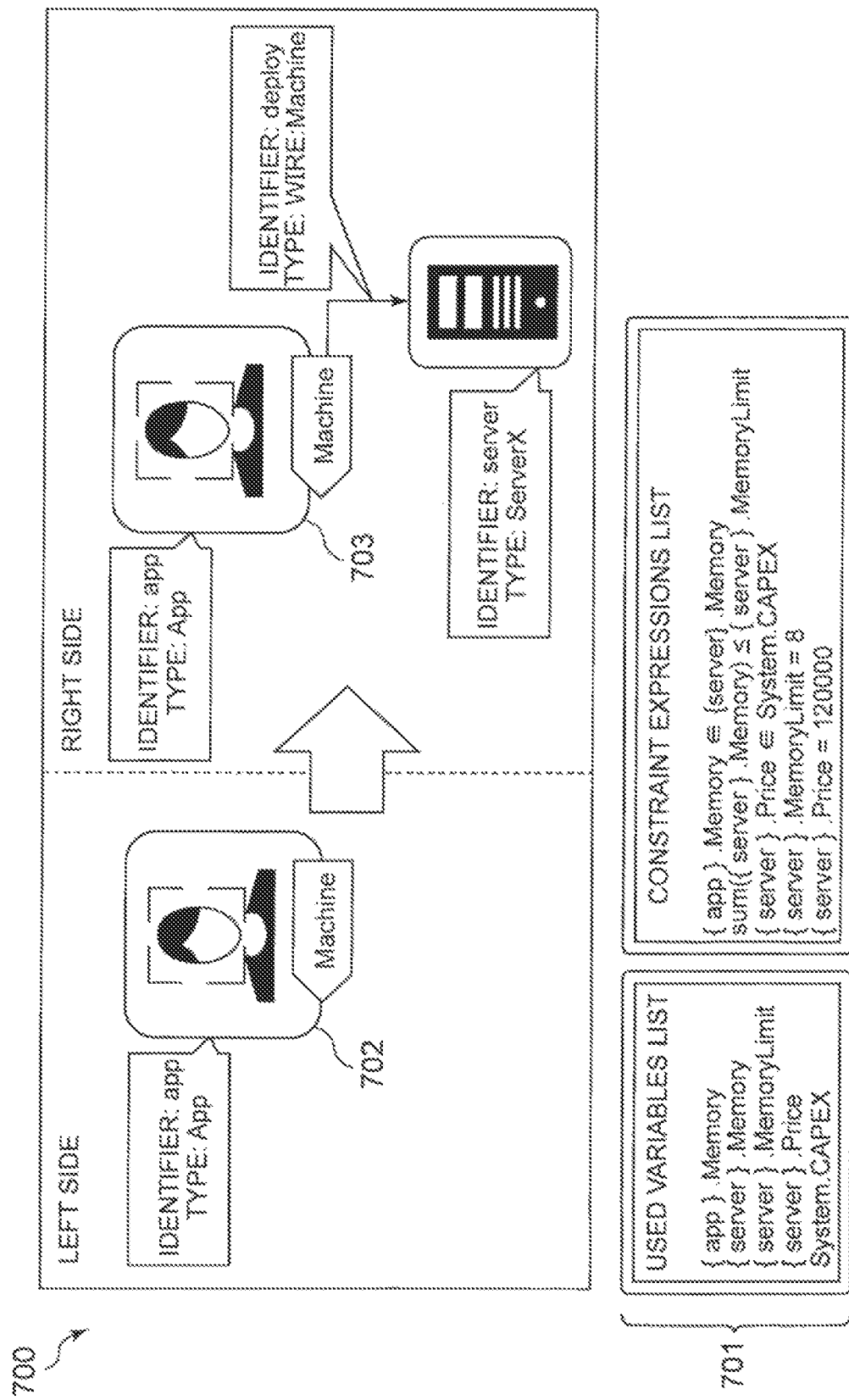
FIG. 8 It depicts a schematic diagram showing an example of a concretizing rule.

The concretizing rules in each example embodiment are described below. FIG. 8 is a schematic diagram showing an example of a concretizing rule. The concretizing rule 700 comprises information indicating an object of concretization (hereinafter referred to as the left side (of the concretizing rule)), information indicating a configuration after concretization (hereinafter referred to as the right side (of the concretizing rule)), and a template for generating quantitative requirements that are added when concretizing (hereinafter referred to as the quantitative requirements template). 701.

The format of the quantitative requirements template is basically the same as for the quantitative requirements, and includes a used variables list and a constraint expressions list. However, the quantitative requirements template includes a part that refers to identifiers included in the left side or the right side, in variable names listed in the used variables list and in variables appearing in constraint expressions included in the constraint expressions list. Referencing an identifier (entity identifier) contained in the left side or the right side is referred to as a provisional variable reference. However, there may be a variable that does not refer to an identifier included in the left side or the right side. In this example embodiment, the part of a variable name described in a quantitative requirements template that refers to an identifier included in the left side or the right side (in other words, the part that corresponds to a provisional variable reference) is described by the expression "{identifier}".

For example, suppose there is an identifier of an entity called "Node1" on the left side or the right side. If the name of a variable refers to that identifier, then the name of the variable contains the expression {Node1}. For example, {Node1}.MemoryLimit and other variable names are used in the quantitative requirements template.

In the example shown in FIG. 8, variable names are described in the quantitative requirements template, including the parts referring to the entity identifier "app" or the identifier "server" included in the left side and the right side.

Next, how the abstract configuration is concretized by the concretizing rule is described below.

A concretizing rule R is said to be applicable to an abstract configuration D when the structure corresponding to the left side of the concretizing rule R is included in the abstract configuration D. Here, "having a corresponding structure" means that there is a one-to-one corresponding node and a one-to-one corresponding edge. However, the expression "edge E1 corresponds to edge E2" does not only mean the correspondence of edges alone with respect to type information, but also includes the meaning that the nodes at both ends are corresponding nodes. For example, suppose that edge E1 is an edge determined from node Na to node Nb, and edge E2 is an edge determined from node Nc to node Nd. In this case, in order for edge E1 to be said to correspond to edge E2, node Na must correspond to node Nc, and node Nb must correspond to node Nd.

The "substructure of the abstract configuration D, corresponding to the left side of the concretizing rule R" is called the concretization object of the abstract configuration D by the concretizing rule R.

When a concretizing rule R can be applied to an abstract configuration D, the abstract configuration D has a substructure (i.e., the concretization object) that corresponds one-to-one with the left side of the concretizing rule R. Rewriting of an abstract configuration D with a concretizing rule R means replacing the concretization object with the structure represented by the right side of the concretizing rule R. In this case, an entity that has an identifier in common with the left side and the right side is replaced by the same entity as the one in the left side. If there is an entity on the right side that is not common with the left side, then a new entity corresponding to the entity is created and added to the concretization object. Also, an identifier that does not overlap with any other identifier is added as an identifier of the entity.

After rewriting the abstract configuration, all provisional variable references in the quantitative requirements template are replaced with the identifiers of the corresponding entities in the replaced configuration. For example, suppose that the node with the identifier "Node1" in the left side of the concretizing rule corresponds to the node "Server1" in the configuration after the replacement. "Server1" is an identifier. In this case, a variable name such as "{Node1}.MemoryLimit" described in the quantitative requirements template is replaced with "Server1.MemoryLimit" and so on. The part corresponding to a provisional variable reference that refers to an identifier that exists only in the right side is replaced with the identifier of the corresponding entity newly added when replacing the concretization object.

Quantitative requirements template of which all provisional variable references are replaced with the identifiers of the corresponding entities in the configuration after replacement, become new quantitative requirements that are added to the quantitative requirements. As the new quantitative requirements are added, the quantitative requirements are updated. That is, each variable name after replacing a provisional variable reference described by the representation "{identifier}" with an identifier is added to the used variables list, and each constraint expression after replacing a provisional variable reference described by the representation "{identifier}" with an identifier is added to the constraint expressions list, thus updating the quantitative requirements. Variable names without provisional variable references should be added to the used variables list as is, and constraint expressions without provisional variable references should be added to the constraint expressions list as is.

Taking FIG. 8 as an example, the concretizing rule is described in detail below. The left side and the right side of the concretizing rule 700 shown in FIG. 8 represent the transformation of a graph including a node of type "App" whose "Machine" request is not satisfied into a graph whose request is satisfied by connecting a node of type "ServerX" to the node of type "App".

The quantitative requirements template 701 also indicates constraints on the memory usage upper limits for applications deployed to ServerX and constraints on the budget required to deploy ServerX.

Here, it should be noted that node 702 on the left side and node 703 on the right side, with a common identifier "app", represent common nodes.

Rewriting the abstract configuration with concretizing rule 700 involves the operation of connecting a newly created node of type "ServerX" with an edge of type "WIRE:Machine" to the node of type "App" already included in the abstract configuration.

The used variables list within the quantitative requirements template contained in the concretizing rule 700 illustrated in FIG. 8 includes the following five variables.

"{app}.Memory"
"{server}.Memory"
"{server}.MemoryLimit"
"{server}. Price".
"System. CAPEX"

In addition, the constraint expressions list within the quantitative requirements template contained in the concretizing rule 700 includes the following five constraint expressions.

{app}.Memory∈{server}.Memory
sum({server}.Memory)≤{server}.MemoryLimit
{server}.Price∈System.CAPEX
{server}.MemoryLimit=8
{server}.Price=120000

The variable "{app}.Memory" is a numeric-type variable, and in this example, the value of the variable is the amount of memory used by the node representing the application corresponding to the identifier app.

The variable "{server}.Memory" is a set-type variable, in this example, the value of the variable is a set of variables for the "amount of memory used" of all applications that consume the memory of the node representing the physical machine corresponding to the identifier server.

The variable "{server}.MemoryLimit" is a numeric-type variable, and in this example, the value of the variable is the upper limit of the amount of available memory of the node representing the physical machine corresponding to the identifier server.

The variable "{server}.Price" is a numeric-type variable, and in this example, the value of the variable is the installation cost required to deploy the node representing the physical machine corresponding to the identifier server.

The variable "System.CAPEX" is a set-type of variable, and in this example, the value of the variable is a set of variables corresponding to the "installation cost" of new equipment that needs to be deployed to configure the system.

Thus, "{app}.Memory∈{server}.Memory" indicates that "the application corresponding to the identifier app consumes the memory of the physical machine corresponding to the identifier server".

"sum({server}.Memory)≤{server}. MemoryLimit" indicates that "the total memory consumption of the physical machine corresponding to the identifier server is less than or equal to the upper limit of the amount of available memory of the physical machine".

"{server}.Price∈System.CAPEX" indicates that a new physical machine corresponding to the identifier server needs to be deployed and requires an installation fee.

"{server}. MemoryLimit=8" indicates that the upper limit of the amount of available memory of the physical machine corresponding to the identifier server is 8 (GB)".

"{server}.Price=120000" indicates that "the installation cost for the deployment of the physical machine corresponding to the identifier server is 120,000 (yen)".

Concretizing the quantitative requirements template 701 (i.e., replacing a provisional variable reference with an identifier in the configuration that has been replaced from the abstract configuration) provides quantitative requirements to be added. The quantitative requirements are to avoid problems in terms of "memory used" and "budget limit" in the abstract configuration that is currently being concretized when a new physical machine corresponding to the identifier server is deployed and the application corresponding to the identifier app is deployed to the physical machine.

The quantitative requirements template 701 is used to derive additional quantitative requirements that are needed when the transformation of the graph structure from the left side to the right side is applied to the abstract configuration.

Next, the concrete configuration derived in each example embodiment is described below.

A concrete configuration is information that indicates a system configuration in which an undetermined part does not exist. A concrete configuration can also be said to be a fully concretized abstract configuration. Here, "fully concretized" means that the following three conditions are met: (1), (2), and (3).

(1) Each type of all nodes in the abstract configuration must be a "concrete" type.

Furthermore, whether the type of node is concrete or not is predefined, depending on the type.

(2) Each type of all edges in the abstract configuration must be a "concrete" type.

Furthermore, whether the type of edge is concrete or not is predefined, depending on the type.

(3) For all nodes included in the abstract configuration, the parts requested by the nodes are connected by the appropriate edges.

An abstract configuration satisfying all the above three conditions contains no undetermined elements other than attribute values. Therefore, a concrete configuration represents a configuration that actually operates as an ICT system by assigning appropriate setting values according to attribute value constraints given to the concrete configuration.

Figure 9:
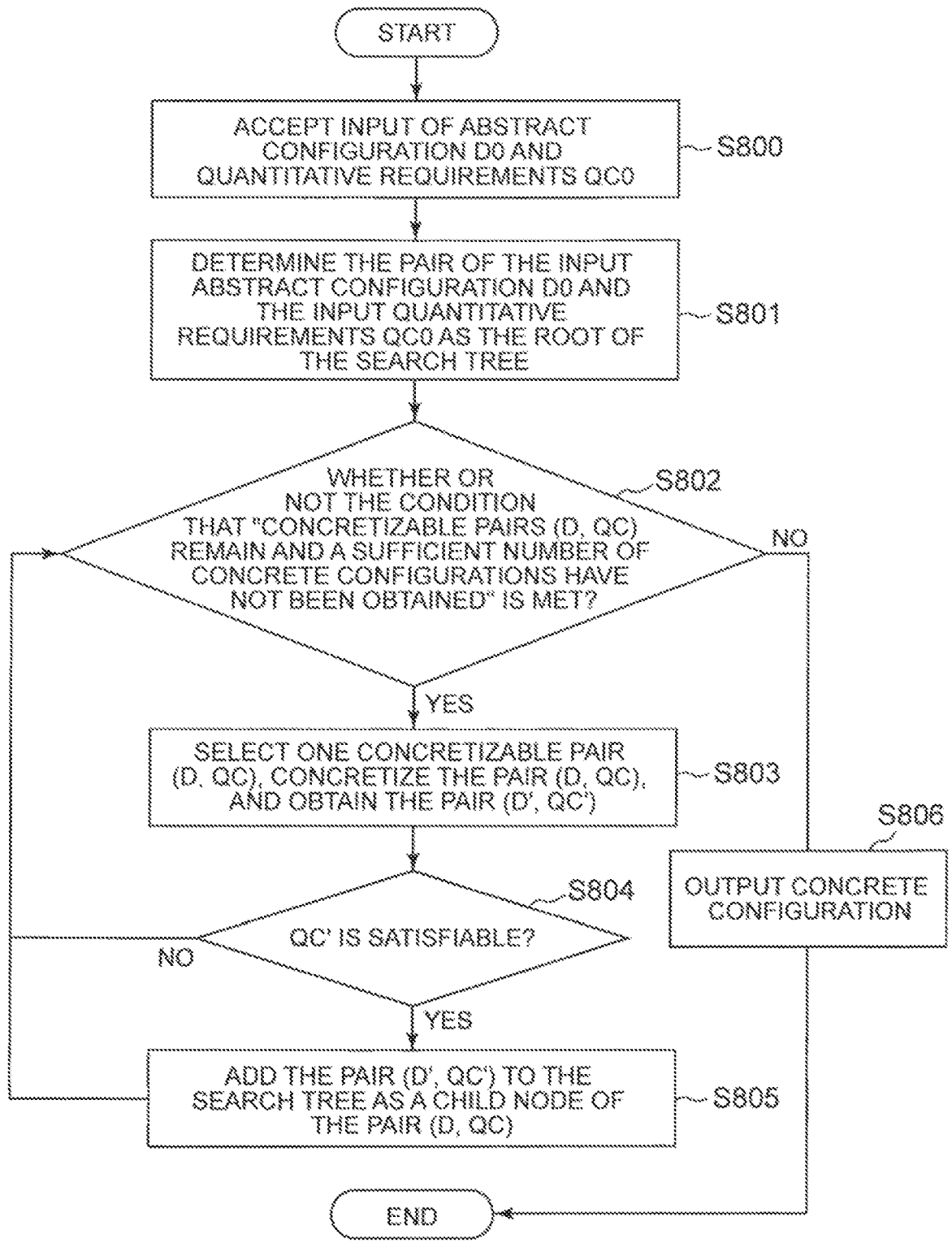
FIG. 9 It depicts a flowchart showing an example of the processing progress of the configuration information concretizing unit in the first example embodiment.

Next, the processing progress in the first example embodiment will be described. FIG. 9 is a flowchart showing an example of the processing progress of the configuration information concretizing unit 101 in the first example embodiment.

First, the configuration information concretizing unit 101 accepts input of an abstract configuration and quantitative requirements (step S800). The abstract configuration and quantitative requirements to be input are correlated together.

In the following, abstract configurations are represented by the sign D, and quantitative requirements are represented by the sign QC. In particular, the first abstract configuration to be input is represented by the sign D0, and the first quantitative requirements to be input are represented by the sign QC0.

Next to step S800, the configuration information concretizing unit 101 determines the pair of the input abstract configuration D0 and the input quantitative requirements QC0 as the root of the search tree (step S801).

This search tree is based on pairs of abstract configuration and quantitative requirements as nodes. The pairs of abstract configuration and quantitative requirements may also be written as pairs (D, QC), etc.

Next to step S801, the configuration information concretizing unit 101 determines whether or not the condition that "concretizable pairs (D, QC) remain and a sufficient number of concrete configurations have not been obtained" is met (step S802). Here, a concretizable pair (D, QC) is a pair of abstract configuration D that can be concretized and quantitative requirements QC that are correlated to the abstract configuration D. The "sufficient number" above is also predetermined.

If the above conditions are met (Yes in step S802), the configuration information concretizing unit 101 selects one concretizable pair (D, QC), and concretizes the pair (D, QC) using a concretizing rule to obtain the pair (D', QC') (step S803). In step S803, the configuration information concretizing unit 101 generates the abstract configuration D' by concretizing the abstract configuration D, based on the concretizing rule. Then, the configuration information concretizing unit 101 generates quantitative requirements to be newly added by concretizing the quantification requirement template included in the concretizing rule, and updates the quantification requirements QC by adding the quantitative requirements to the quantification requirements QC. After this update (in other words, after the addition), the quantification requirements are the quantification requirements QC'.

When selecting one concretizable pair (D, QC) in step S803, the configuration information concretizing unit 101 selects one pair (D, QC) from the pairs (D, QC) included in the search tree. The pair (D, QC) to be selected must meet the following conditions. That is, in the pair, "the abstract configuration D is not fully concretized". Moreover, "there is concretizing rule R that is applicable to the concretization object in the abstract configuration D and has not yet been applied to the concretization object". In this case, for example, if there are two concretization objects to which concretizing rule R can be applied in the abstract configuration D, and concretizing rule R is applied to only one of the concretization objects, the concretizing rule R is treated as a concretizing rule that has not yet been applied to the concretization object in the abstract configuration D.

Next to step S803, the configuration information concretizing unit 101 inputs the quantitative requirements QC' to the quantitative requirement verification unit 103, and requests the quantitative requirement verification unit 103 to verify whether the assignment of values of variables meeting the quantitative requirements QC' exists or not. The quantitative requirement verification unit 103, upon request from the configuration information concretizing unit 101, verifies whether the assignment of values of the variables meeting the quantitative requirements QC' exists or not, and returns the verification results to the configuration information concretizing unit 101. The configuration information concretizing unit 101 determines whether or not the quantitative requirements QC' is satisfiable according to the verification result (step S804). In other words, the configuration information concretizing unit 101 determines whether or not there is an assignment of a values of a variables that meets the quantitative requirements QC' according to the result of the verification.

If the quantitative requirements QC' is satisfiable (Yes in step S804), the configuration information concretizing unit 101 adds the pair (D', QC') to the search tree as a child node of the pair (D, QC) selected in step S803 (Step S805).

After step S805, the configuration information concretizing unit 101 moves to step S802 and repeats the process from step S802 onward.

If the quantitative requirements QC' are unsatisfiable (No in step S804), the configuration information concretizing unit 101 moves to step S802 without performing step S805, and repeats the process from step S802 onward.

If, in step S802, it is determined that the condition that "concretizable pairs (D, QC) remain and a sufficient number of concrete configurations have not been obtained" is not met (No in step S802), the configuration information concretizing unit 101 outputs the obtained concrete configurations (step S806) and processes end. In step S806, the configuration information concretizing unit 101 may output all of the obtained concrete configurations, or may output some (e.g., one) of the obtained concrete configurations.

Figure 10:
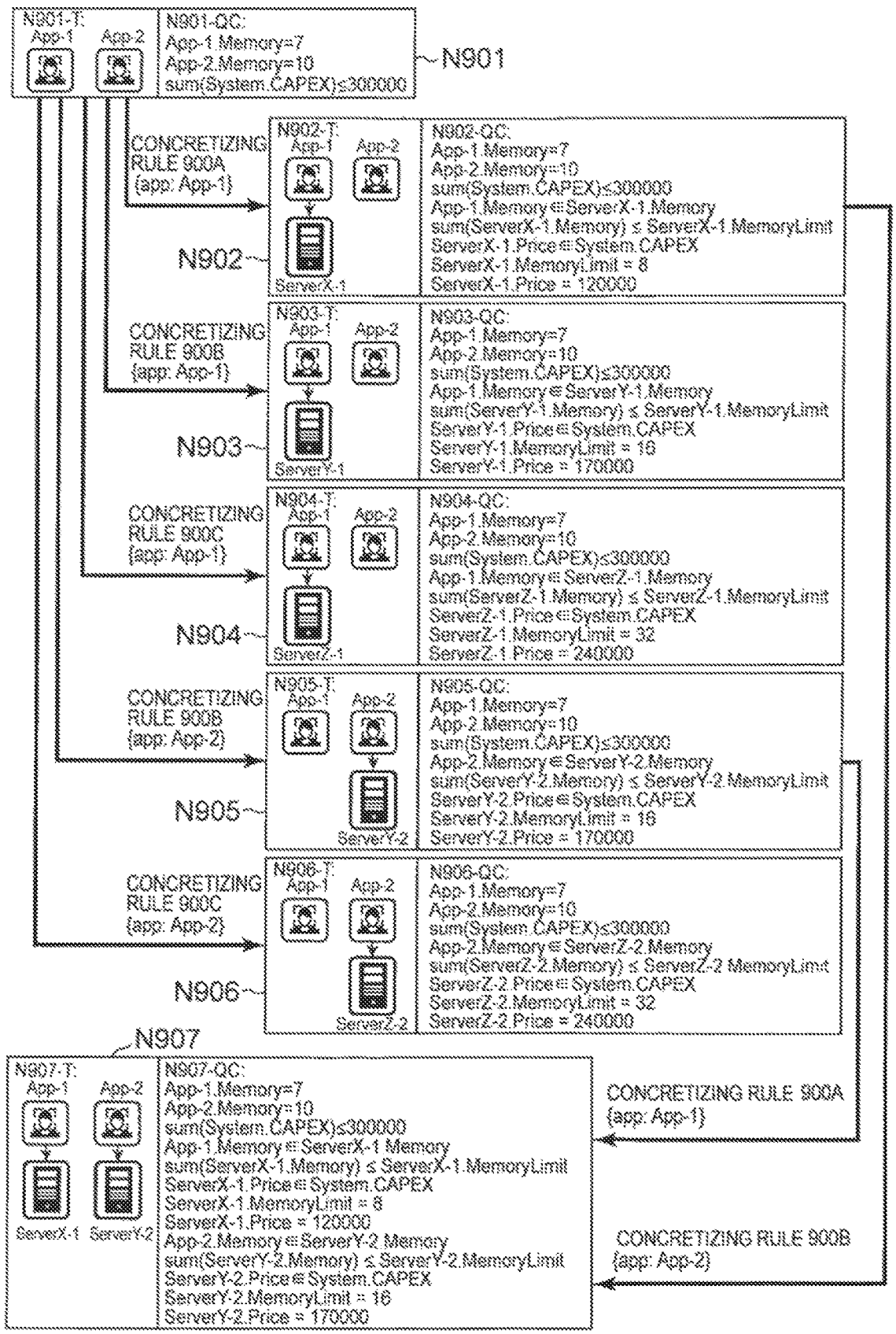
FIG. 10 It depicts a schematic diagram showing an example of a search tree generated by the configuration information concretizing unit.

Next, an example of a search tree generated by the configuration information concretizing unit 101 is described below. FIG. 10 is a schematic diagram showing an example of a search tree generated by the configuration information concretizing unit 101. Pair N901 is a root of a search tree. Also, pair N901 is a pair of abstract configuration N901-T and quantitative requirements N901-QC. For the sake of clarity, in FIG. 10, the quantitative requirements are shown by only constraint expressions list. This is not limited to pair N901. Also, at each node of the abstract configuration, the labels indicating the requested part are omitted from the diagram. In fact, each node of App type is accompanied by a label requesting "Machine".

The abstract configuration N901-T is an abstract configuration in which there are only nodes of App type "App-1" and "App-2" whose "Machine" requests are not satisfied.

In addition, used variables list in the quantitative requirements N901-QC includes the variables "App-1.Memory", "App-2.Memory" and "System.CAPEX". The constraint expressions list in the quantitative requirements N901-QC includes only three constraint expressions "App-1.Memory=7", "App-2.Memory=10", and "sum(System.CAPEX)≤300000".

The input person of pair N901 has input the abstract configuration N901-T into the system configuration derivation device, which represents that the input person wants to deploy the applications App-1 and App-2. The input person has also input the following quantitative requirements N901-QC: "App-1 requires 7 GB of memory", "App-2 requires 10 GB of memory", and "The upper limit of cost newly required to build the system is not more than 300,000 yen".

Figure 11:
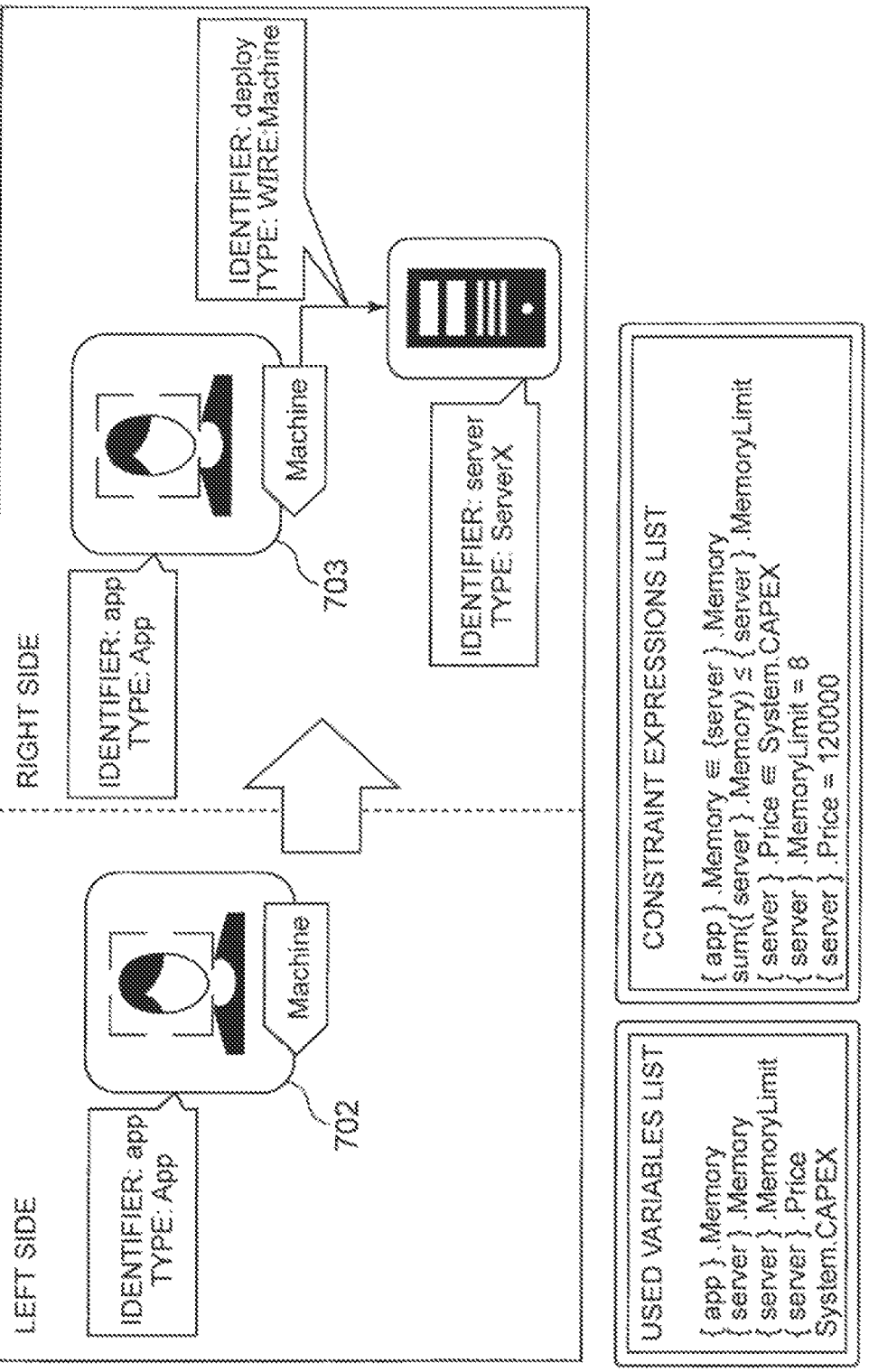
FIG. 11 It depicts a schematic diagram showing a concretizing rule used to generate the search tree shown in FIG. 10.
Figure 12:
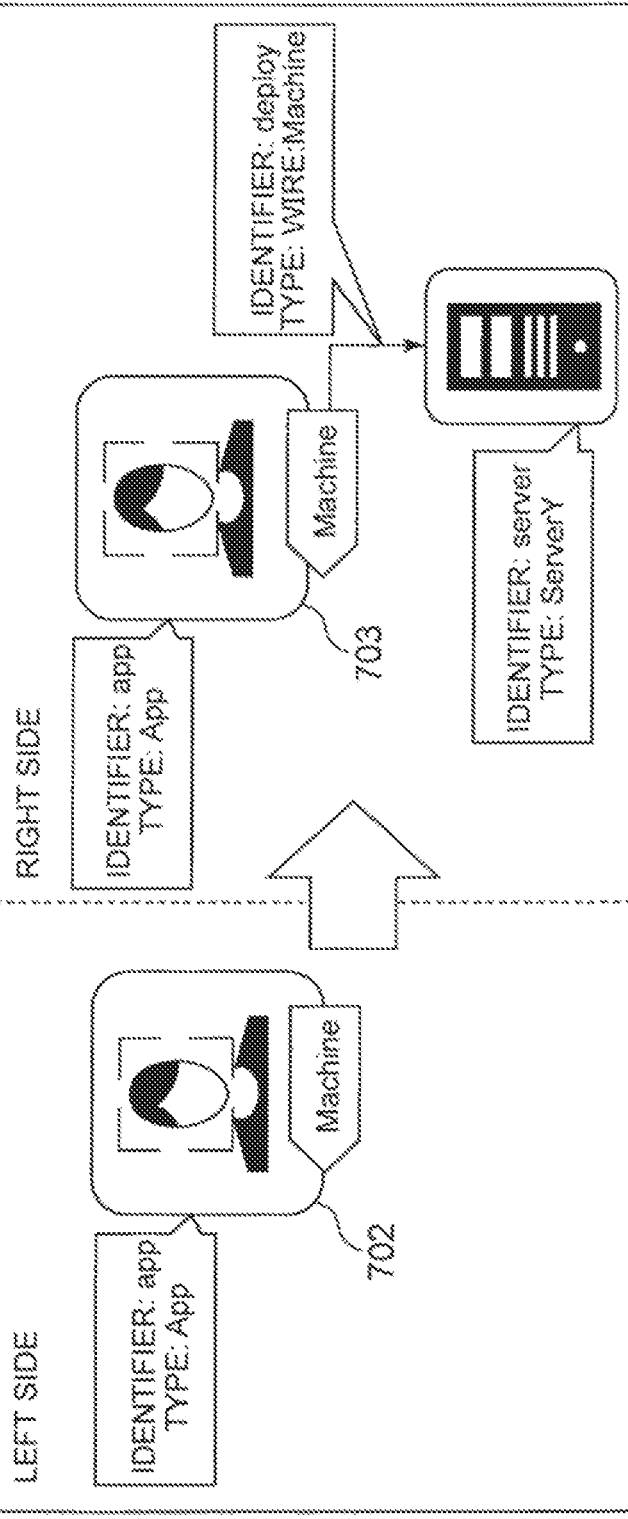
FIG. 12 It depicts a schematic diagram showing a concretizing rule used to generate the search tree shown in FIG. 10.
Figure 13:
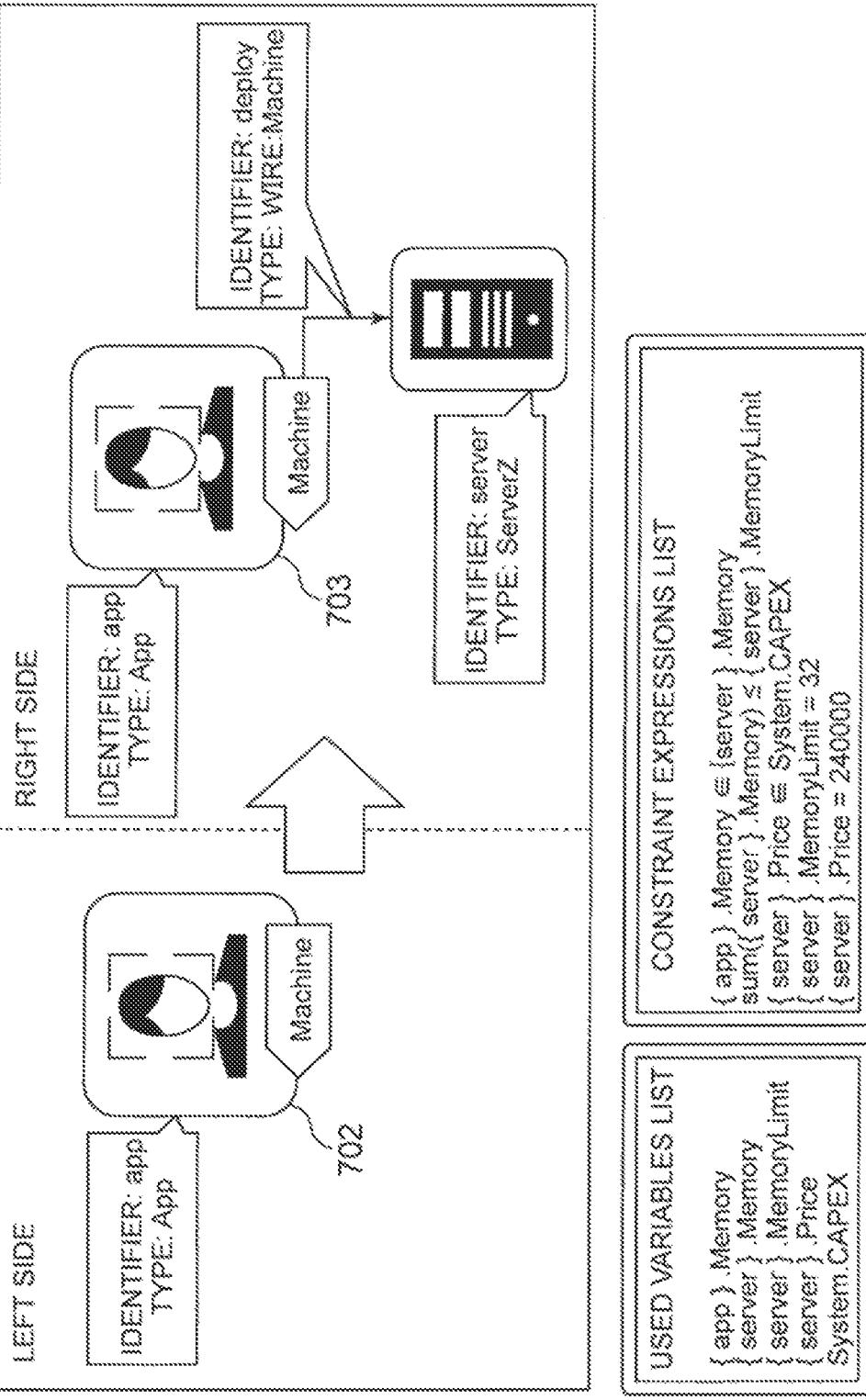
FIG. 13 It depicts a schematic diagram showing a concretizing rule used to generate the search tree shown in FIG. 10.

FIGS. 11, 12 and 13 are schematic diagrams showing the concretizing rules used to generate the search tree shown in FIG. 10.

The concretizing rule 900A shown in FIG. 11 is identical to the concretizing rule 700 shown in FIG. 8.

The concretizing rule 900B shown in FIG. 12 is a rule that replaces the type "ServerX" in concretizing rule 700 (see FIG. 8) with the type "ServerY". With this substitution, "{server}.MemoryLimit=8" in the concretizing rule 700 is replaced with "{server}.MemoryLimit=16", and "{server}.Price=120000" in concretizing rule 700 is replaced with "{server}.Price=170000". Other aspects of concretizing rule 900B are identical to concretizing rule 700 (see FIG. 8).

The concretizing rule 900C shown in FIG. 13 is a rule that replaces the type "ServerX" in concretizing rule 700 (see FIG. 8) with the type "ServerZ". With this substitution, "{server}.MemoryLimit=8" in the concretizing rule 700 is replaced with "{server}.MemoryLimit=32", and "{server}.Price=120000" in concretizing rule 700 is replaced with "{server}.Price=240000". Other aspects of concretizing rule 900C are identical to concretizing rule 700 (see FIG. 8).

With the three concretizing rules 900A, 900B, and 900C, five patterns of concretization are possible from pair N901 (see FIG. 10). In other words, there are following patterns of concretization: the concretization by one of the concretizing rules 900A, 900B, and 900C when the concretization object is "App-1", and the concretization by one of the concretizing rules 900B and 900C when the concretization object is "App-2". These five patterns of concretization yield the five pairs N902, N903, N904, N905, and N906 as a pair of abstract configuration and quantitative requirements.

Here, when the "App-2" of the abstract configuration N901-T of pair N901 is the concretization object, the pair, when concretized by the concretizing rule 900A, is not added to the search tree. The reason for this is that there is no assignment of values to variables that would meet the updated quantitative requirements obtained during the concretization. Specifically, if the identifier of a newly created node of type "ServerX" is "ServerX-1", then the updated constraint expressions list will contain the following constraint expressions.

"App-1.Memory=7"
"App-2.Memory=10"
"sum(System.CAPEX)≤300000"
"App-2.Memory∈ServerX-1.Memory"
"sum(ServerX-1.Memory)≤ServerX-1.MemoryLimit"
"ServerX-1.Price∈System.CAPEX"
"ServerX-1.MemoryLimit=8"
"ServerX-1.Price=120000"

There is no value assignment to the variables that would satisfy all these constraint expressions. In other words, the updated quantitative requirements are unsatisfiable. Therefore, if "App-2" of the abstract configuration N901-T is the concretization object, the pair as concretized by the concretizing rule 900A is not added to the search tree.

Of the five pairs obtained by concretizing pair N901, only pair N902 and N905 can be further concretized. Pair N902 can be concretized by using the concretizing rule 900B when the concretization object is "App-2". Pair N905 can be concretized by using the concretizing rule 900A when the concretization object is "App-1". In both cases, the result of the concretization is pair N907 (see FIG. 10). The configuration N907-T in the pair N907 is a fully concretized concrete configuration. Therefore, the concrete configuration N907-T is the only system configuration that satisfies the input pair N901.

Note that pairs obtained by applying concretizing rules other than the above to pairs N902 and N905, and pairs obtained by applying concretizing rules to pairs N903, N904, and N906, are not added to the search tree. As in the previous case, this is because there is no assignment of values to the variables that would meet the updated quantitative requirements obtained during the concretization. That is, the updated quantitative requirements are unsatisfiable.

The above is a description of a specific example of a search tree.

Next, the operation of the quantitative requirement verification unit 103 will be described. When the quantitative requirement verification unit 103 receives a quantitative requirement from the configuration information concretizing unit 101, it verifies whether or not an assignment of value to variables that meets the quantitative requirement exists, and returns the verification result (i.e., whether or not an assignment of value to variables that meets the quantitative requirement exists) to the configuration information concretizing unit 101.

If there is a value assignment to variables that satisfies the quantitative requirement, then the quantitative requirement is satisfiable, and if there is no value assignment to such variables, then the quantitative requirement is unsatisfiable.

The values of numeric-type variables do not affect the values of set-type variables. Therefore, the quantitative requirement verification unit 103 determines the elements that are the values of the set-type variables and transforms the constraint expressions including the set-type variables into constraint expressions including only numeric-type variables. The quantitative requirement verification unit 103 then verifies the satisfiability of the quantitative requirements by verifying whether or not there exists a value assignment to variables that satisfies the constraints imposed by the constraint expressions containing only numeric-type variables.

Figure 14:
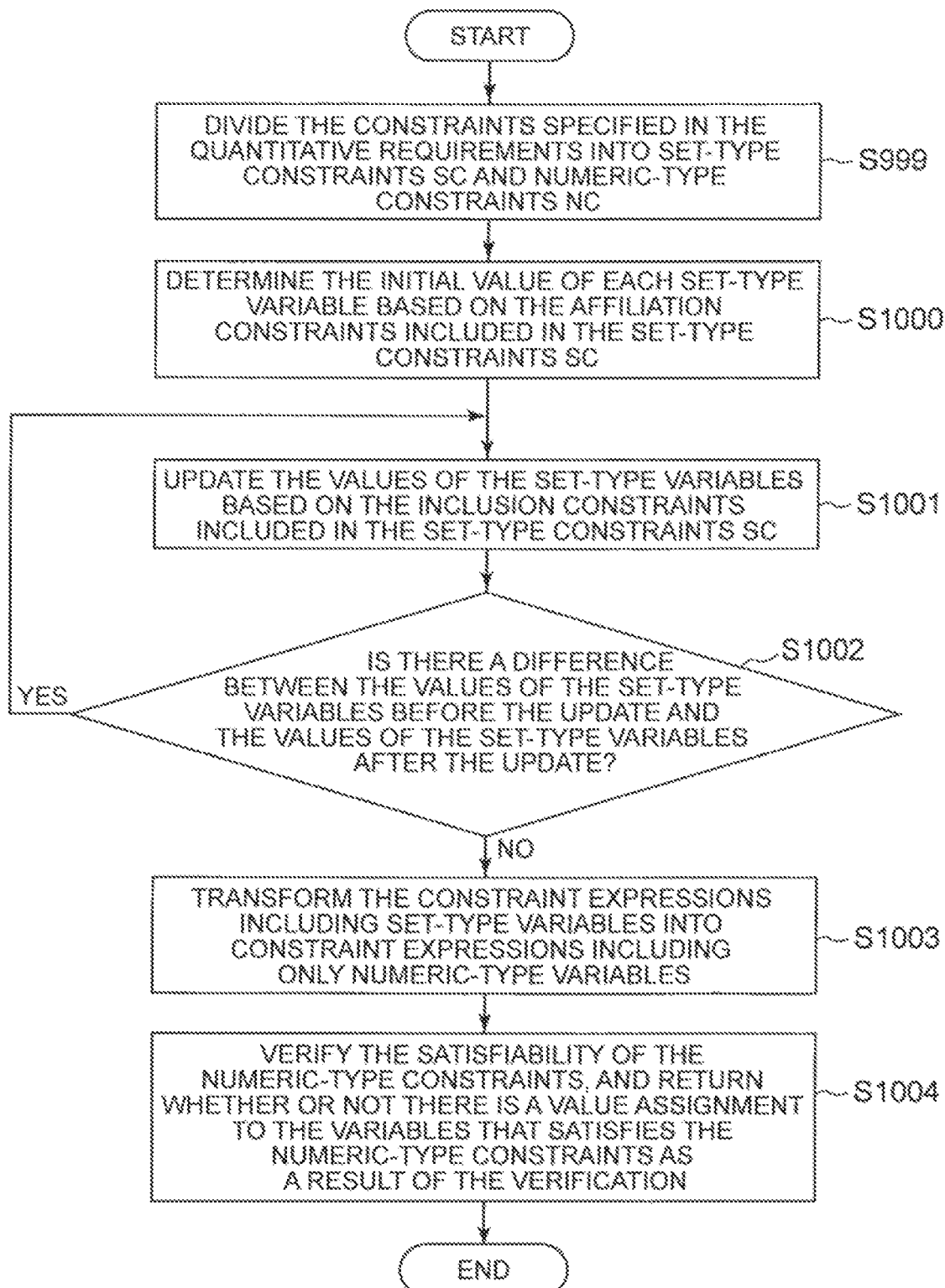
FIG. 14 It depicts a flowchart showing an example of the processing progress of the quantitative requirement verification unit.

FIG. 14 is a flowchart showing an example of the processing progress of the quantitative requirement verification unit 103.

The quantitative requirement verification unit 103 divides the constraints specified in the quantitative requirements given by the configuration information concretizing unit 101 into set-type constraints (hereinafter represented by the sign SC) and other numeric-type constraints (hereinafter represented by the sign NC) (step S999). The set-type constraints SC can be classified into affiliation constraints of the form "x∈A" and inclusion constraints of the form "A⊆B".

Next, the quantitative requirement verification unit 103 determines the initial value of each set-type variable based on the affiliation constraints included in the set-type constraints SC (step S1000). If one or more numeric-type variables respectively belong to a set that is the value of a common set-type variable, the quantitative requirement verification unit 103 determines the set of the numeric-type variables as the initial value of the set-type variable. For example, suppose that all affiliation constraints on a set-type variable A are "x(1)∈A", "x(2)∈A", . . . , and "x(n)∈A". x(1), x(2), . . . , and x(n) are numeric-type variables. In this case, the quantitative requirement verification unit 103 determines the initial value of the set-type variable A to be "A={x(1), x(2), . . . , x(n)}". The quantitative requirement verification unit 103 determines initial values for each of the other set-type variables as well.

Next to step S1000, the quantitative requirement verification unit 103 updates the values of the set-type variables based on the inclusion constraints included in the set-type constraints SC (step S1001). In step S1001, the quantitative requirement verification unit 103 adds all the numeric-type variables included in the set which is the value of the set-type variable S(1) to the set which is the value of the set-type variable S(2) with respect to the inclusion constraint "S(1)⊆S(2)". However, the numeric-type variables already included in the set which is the value of the set-type variable S (2) are not added in duplicate. The quantitative requirement verification unit 103 performs this action for each inclusion constraint.

Next, the quantitative requirement verification unit 103 determines whether there is a difference between the values of the set-type variables before the update in step S1001 and the values of the set-type variables after the update (step S1002).

If there is a difference (Yes in step S1002), the quantitative requirement verification unit 103 repeats the operation from step S1001 onward.

If there is no difference (No in step S1002), the values of the set-type variables at that point in time is the only model of the set-type constraint SC under the Closed World Assumption. If there is no difference (No in step S1002), the quantitative requirement verification unit 103 transforms the constraint expressions including set-type variables into constraint expressions including only numeric-type variables (step S1003). That is, the quantitative requirement verification unit 103 removes the set-type variables from the constraint expressions. For example, suppose that "sum (S)" means the sum of numeric-type variables included in the set that is the value of the set-type variable S. And suppose that the set that is the value of the set-type variable S is {a, b, c, d}. In this case, the quantitative requirement verification unit 103 transforms a constraint expression "sum (S)≤ub", which includes the set-type variable S, into a constraint expression "a+b+c+d≤ub", which includes only numeric-type variables.

Next, after step S1003, the quantitative requirement verification unit 103 verifies the satisfiability of the numeric-type constraints, and returns whether or not there is a value assignment to the variables that satisfies the numeric-type constraints to the configuration information concretizing unit 101 as a result of the verification (step S1004). Here, the existence of a value assignment to the variables that satisfies the numeric-type constraints means that the value assignment to the variables that satisfies quantitative requirements exist. The absence of a value assignment to the variables that satisfies the numeric-type constraints means that there is no value assignment to the variables that satisfies the quantitative requirements.

The method for determining whether or not a value assignment to the variables satisfying the numeric-type constraints exists in step S1004 is not limited and may be a known method. Examples of methods to determine whether or not the value assignment to the variables satisfying the numeric-type constraints exists include, for example, Fourier-Motzkin's elimination method or a quantifier elimination algorithm using Cylindrical Algebraic Decomposition (CAD).

Figure 15:
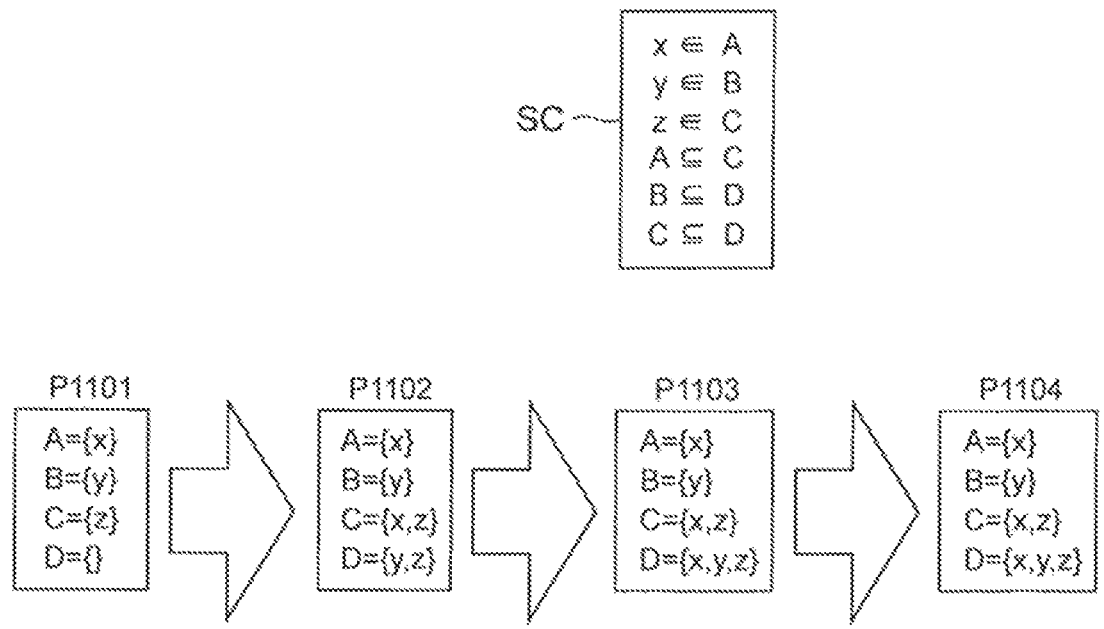
FIG. 15 It depicts a schematic diagram showing a concrete example of a change in the values of set-type variables.

Next, when steps S1001 and S1002 are repeated until there are no differences in the values of the set-type variables before and after the update, a concrete example of the change in the values of the set-type variables is shown. FIG. 15 is a schematic diagram showing a concrete example of a change in the values of the set-type variables.

Suppose that the set-type constraints SC shown in FIG. 15 is obtained. This set-type constraints SC contains the affiliation constraints "x∈A", "y∈B" and "z∈C", and the inclusion constraints "A⊆C", "B⊆D" and "C⊆D". Here, x, y, and z are numeric-type variables. A, B, C, and D are set-type variables.

P1101, shown in FIG. 15, is the initial value of each set-type variable A, B, C, and D. The affiliation constraints are only "x∈A", "y∈B" and "z∈C". Therefore, the initial value of A is {x}, the initial value of B is {y}, and the initial value of C is {z}. Also, the initial value of D is { } (i.e., the empty set).

P1102, shown in FIG. 15, represents the result of a single execution of step S1001 (see FIG. 14) from the state of P1101. Due to the inclusion constraint "A⊆C", the numeric-type variable included in the initial value of A is added to the set that is the value of C. This results in the value of C being {x, z}. Also, due to the inclusion constraints "B⊆D" and "C⊆D", the numeric-type variable in the initial value of B and the numeric-type variable in the initial value of C are added to the set that is the value of D. This results in the value of D being {y,z}.

P1103, shown in FIG. 15, represents the result of one more execution of step S1001 from the state of P1102. Due to the inclusion constraint "A⊆C", the numeric-type variable included in the value of A is added to the set that is the value of C. However, a numeric-type variable already included in the set that is the value of C is not added in duplicate, so the value of C remains {x, z}. Also, due to the inclusion constraints "B⊆D" and "C⊆D", the numeric-type variable included in the value of B and the numeric-type variables included in the value of C are added to the set that is the value of D. This results in the value of D being {x, y, z}.

P1104, shown in FIG. 15, represents the result of one more execution of step S1001 from the state of P1103. Due to the inclusion constraint "A⊆C", the numeric-type variable included in the value of A is added to the set that is the value of C. However, a numeric-type variable already included in the set that is the value of C is not added in duplicate, so the value of C remains {x, z}. Also, due to the inclusion constraints "B⊆D" and "C⊆D", the numeric-type variable included in the value of B and the numeric-type variables included in the value of C are added to the set that is the value of D. However, the numeric-type variables already included in the set that is the value of D are not added in duplicate, so the value of D remains {x, y, z}. In other words, there is no difference between P1103 before the update and P1104 after the update, and the process moves to step S1003 (FIG. 14) with P1104.

In this example embodiment, the configuration information concretizing unit 101 accepts input of an abstract configuration and quantitative requirements. Then, the configuration information concretizing unit 101 applies concretizing rules to the abstract configuration and repeats concretization of the abstract configuration and update of the quantitative requirements. Finally, if a concrete configuration indicating a fully concretized ICT system configuration is obtained, the configuration information concretizing unit 101 outputs the concrete configuration.

The configuration information concretizing unit 101 of this example embodiment also queries the quantitative requirement verification unit 103 about the satisfiability of the updated quantitative requirements for each concretization of the abstract configuration. As a result, the configuration information concretizing unit 101 allows the abstract configuration to be concretized only if the updated quantitative requirements are satisfiable.

Therefore, the quantitative requirements correlated to the final concrete configuration can also be satisfiable. Therefore, the system configuration derivation device, when given an abstract configuration, and quantitative requirements in which some numerical values are undetermined, is capable of outputting a concrete system configuration concretizing the abstract configuration, the concrete system configuration meets quantitative requirements representing conditions and the like necessary for the operation of a desired system and including given quantitative requirements. For example, it is possible to output a concrete configuration of an ICT system that meets not only functional requirements (a given abstract configuration), but also numerical requirements (e.g., numerical requirements such as performance, resource limitations, network bandwidth, budget, etc.).

Example Embodiment 2

Figure 16:
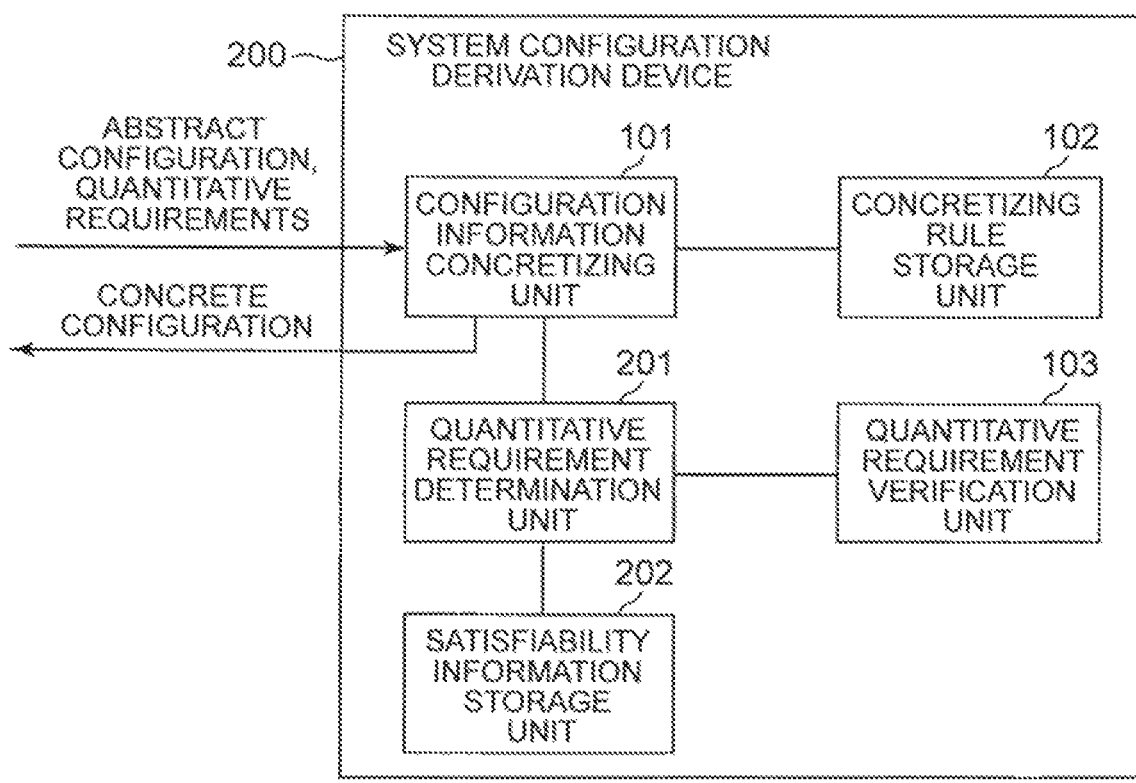
FIG. 16 It depicts a block diagram showing an example configuration of a system configuration derivation device of the second example embodiment of the present invention.

FIG. 16 is a block diagram showing an example configuration of a system configuration derivation device of the second example embodiment of the present invention. The system configuration derivation device 200 of the second example embodiment is provided with a configuration information concretizing unit 101, a concretizing rule storage unit 102, a quantitative requirement verification unit 103, a quantitative requirement determination unit 201, and a satisfiability information storage unit 202.

In this example embodiment, the quantitative requirements that are input to the configuration information concretizing unit 101, and quantitative requirements template in the concretizing rules must satisfy a condition. First, this condition is described below. This condition is hereinafter referred to as the convention W.

Convention W is a condition that is "In a satisfiable quantitative requirements QC, the quantitative requirements WQC that can be made by removing some constraint expressions from the constraint expressions list in quantitative requirements QC must be satisfiable".

In this example embodiment, the system configuration derivation device 200 can operate even when a quantitative requirement that does not satisfy the convention W is input, or a concretizing rule that includes a quantitative requirements template that does not satisfy the convention W is used. However, in that case, the problem arises that the derived concrete configuration may not meet the quantitative requirements, or the concrete configuration may not be derived even though a concrete configuration that is based on the input abstract configuration and meets the quantitative requirements exists.

If the quantitative requirements input into the system configuration derivation device 200 and the quantitative requirements template included in each concretizing rule satisfy the convention W, the above problem does not occur and the appropriate concrete configuration that satisfies the quantitative requirements is obtained.

The concretizing rule storage unit 102 is similar to the concretizing rule storage unit 102 in the first example embodiment. However, the quantitative requirements templates in the concretizing rules stored in the concretizing rule storage unit 102 in the second example embodiment meets the convention W.

The operation of the configuration information concretizing unit 101 is represented by the flowchart shown in FIG. 9, similar to the operation of the configuration information concretizing unit 101 in the first example embodiment. However, in the second example embodiment, the configuration information concretizing unit 101 inputs the quantitative requirements QC' to the quantitative requirement determination unit 201 in step S804 (see FIG. 9), and requires the determination result about the satisfiability of the quantitative requirements QC' to the quantitative requirement determination unit 201. Then, the configuration information concretizing unit 101 receives the determination result back from the quantitative requirement determination unit 201, and based on the decision result, determines whether or not there is a value assignment to variables that meets the quantitative requirements QC'. In other words, in the second example embodiment, the configuration information concretizing unit 101 queries the quantitative requirement determination unit 201, not the quantitative requirement verification unit 103, about the satisfiability of the quantitative requirements QC'. Except for this and the fact that quantitative requirements that satisfy the convention W must be input, the configuration information concretizing unit 101 is similar to the configuration information concretizing unit 101 in the first example embodiment.

The operation of the quantitative requirement verification unit 103 is similar to the operation of the quantitative requirement verification unit 103 in the first example embodiment. However, in the second example embodiment, the quantitative requirement verification unit 103 receives the quantitative requirements from the quantitative requirement determination unit 201, and returns a verification result of whether or not a value assignment to variables that satisfies the quantitative requirements exists to the quantitative requirement determination unit 201. In other words, in a second example embodiment, the quantitative requirement verification unit 103 receives an inquiry about the satisfiability of the quantitative requirements from the quantitative requirement determination unit 201, and returns the verification result to the quantitative requirement determination unit 201.

The satisfiability information storage unit 202 stores pairs of quantitative requirements given to the quantitative requirement verification unit 103 and a verification result regarding the satisfiability of the quantitative requirements derived by the quantitative requirement verification unit 103. Then, when the satisfiability information storage unit 202 receives an inquiry from the quantitative requirement determination unit 201 as to whether or not there is a value assignment to variables that satisfies the quantitative requirements QC', the satisfiability information storage unit 202 returns a response to the inquiry based on the stored pairs (the pairs of quantitative requirements and the verification result).

The quantitative requirement determination unit 201 is given the quantitative requirements QC' from the configuration information concretizing unit 101, and is required the determination result about the satisfiability of the quantitative requirements QC'. Then, the quantitative requirement determination unit 201 gives a query including a constraint expressions list included in the quantitative requirements QC' to the satisfiability information storage unit 202, and queries the satisfiability information storage unit 202 about the satisfiability of the quantitative requirements QC'. If the response from the satisfiability information storage unit 202 reveals whether or not the value assignment to variables that satisfies the quantitative requirements QC' exists, the result is returned to the configuration information concretizing unit 101. However, there may be cases where the response from the satisfiability information storage unit 202 does not reveal whether or not the value assignment to variables that satisfies the quantitative requirements QC' exists. In such a case, the quantitative requirement determination unit 201 gives the quantitative requirements QC' to the quantitative requirement verification unit 103, receives the verification results from the quantitative requirement verification unit 103, and returns the verification results to the configuration information concretizing unit 101.

That is, when the configuration information concretizing unit 101 requires the determination result about the satisfiability of the quantitative requirements QC' to the quantitative requirement determination unit 201, the quantitative requirement determination unit 201 queries the satisfiability of the quantitative requirements QC' to the satisfiability information storage unit 202. If the satisfiability of the quantitative requirements QC' is clarified by the response from the satisfiability information storage unit 202, the quantitative requirement determination unit 201 returns the result to the configuration information concretizing unit 101. If the satisfiability of the quantitative requirements QC' is not clarified by the response from the satisfiability information storage unit 202, the quantitative requirement determination unit 201 requests the quantitative requirement verification unit 103 to verify the satisfiability of the quantitative requirements QC', and returns the verification result to the configuration information concretizing unit 101.

The satisfiability information storage unit 202 receives a query including constraint expressions list (denoted as CL) in the quantitative requirements QC'. There are two types of this query, one of which is written as Qs (CL) and the other as Qf (CL).

When given the query Qs(CL), the satisfiability information storage unit 202 determines whether or not the satisfiability information storage unit 202 stores a pair of constraint expressions list including all the constraint expressions included in the constraint expressions list CL (i.e., the constraint expressions list encompassing the constraint expressions list CL) and a verification result of satisfiability. If the satisfiability information storage unit 202 stores such a pair, the satisfiability information storage unit 202 returns Yes to the quantitative requirement determination unit 201. If the satisfiability information storage unit 202 does not store such a pair, the satisfiability information storage unit 202 returns No to the quantitative requirement determination unit 201. The quantitative requirement determination unit 201 determines that the quantitative requirements QC' are satisfiable if Yes is returned as a response to the query Qs (CL).

When given the query Qf(CL), the satisfiability information storage unit 202 determines whether or not the satisfiability information storage unit 202 stores a pair of constraint expressions list, which is a subset of the constraint expressions list CL, and a verification result of not satisfiable. If the satisfiability information storage unit 202 stores such a pair, the satisfiability information storage unit 202 returns Yes to the quantitative requirement determination unit 201. If the satisfiability information storage unit 202 does not store such a pair, the satisfiability information storage unit 202 returns No to the quantitative requirement determination unit 201. The quantitative requirement determination unit 201 determines that the quantitative requirements QC' are unsatisfiable if Yes is returned as a response to Qf (CL).

An example of a response that the quantitative requirement determination unit 201 receives from the satisfiability information storage unit 202 is shown. For example, suppose that the satisfiability information storage unit 202 stores a pair of quantitative requirements including the constraint expressions list "C1, C2, C3, C4" and a verification result of "satisfiable" and a pair of quantitative requirements including the constraint expressions list "C3, C5" and a verification result of "not satisfiable".

And suppose that the constraint expressions list CL is "C1, C2, C3". In this case, the quantitative requirement determination unit 201 receives a response of "Yes" if the query Qs (CL) is given to the satisfiability information storage unit 202, and the quantitative requirement determination unit 201 receives a response of "No" if the query Qf(CL) is given to the satisfiability information storage unit 202.

Suppose that the constraint expressions list CL is "C3, C4, C5". In this case, the quantitative requirement determination unit 201 receives a response of "No" if the query Qs (CL) is given to the satisfiability information storage unit 202, and the quantitative requirement determination unit 201 receives a response of "Yes" if the query Qf(CL) is given to the satisfiability information storage unit 202.

Suppose that the constraint expressions list CL is "C5". In this case, the quantitative requirement determination unit 201 receives a response of "No" whether the query Qs (CL) is given to the satisfiability information storage unit 202 or the query Qf (CL) is given to the satisfiability information storage unit 202.

Figure 17:
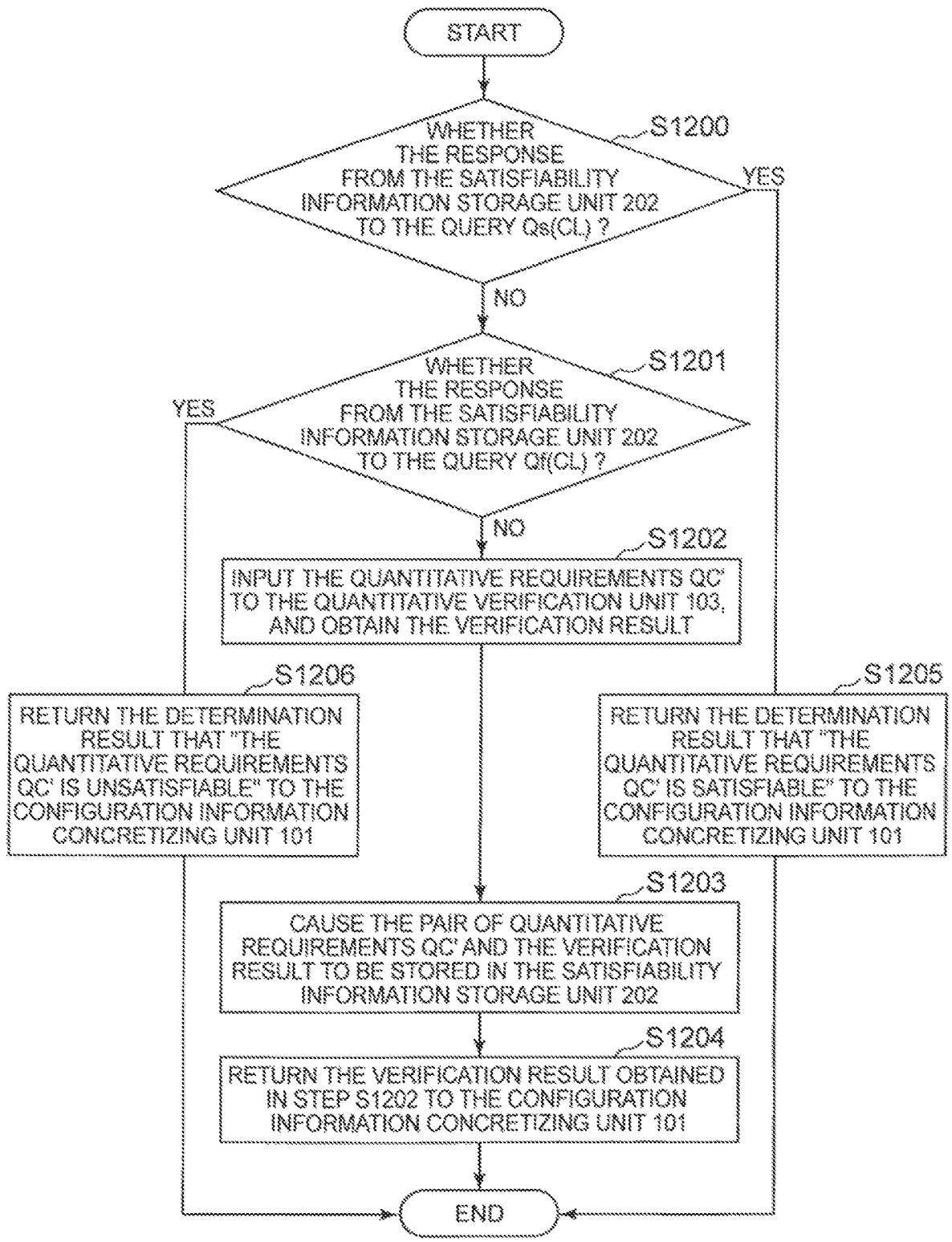
FIG. 17 It depicts a flowchart showing an example of the processing progress of the quantitative requirement determination unit.

Next, the processing process when the quantitative requirement determination unit 201 is given the quantitative requirements QC' from the configuration information concretizing unit 101 in step S804 (see FIG. 9) is described below. FIG. 17 is a flowchart showing an example of the processing progress of the quantitative requirement determination unit 201 at this time. Let CL be a constraint expressions list included in the quantitative requirements QC' given by the configuration information concretizing unit 101.

The quantitative requirement determination unit 201 first provides the query Qs (CL) to the satisfiability information storage unit 202, and determines whether the response from the satisfiability information storage unit 202 to the query Qs (CL) is Yes or No (step S1200).

If the response to the query Qs (CL) is "Yes", the quantitative requirement determination unit 201 returns the determination result that "the quantitative requirements QC' is satisfiable" to the configuration information concretizing unit 101 (step S1205), and the process ends.

If the response to the query Qs (CL) is "No," then the process moves to step S1201. In step S1201, the quantitative requirement determination unit 201 provides the query Qf (CL) to the satisfiability information storage unit 202, and determines whether the response from the satisfiability information storage unit 202 to the query Qf (CL) is "Yes" or "No".

If the response to the query Qf (CL) is "Yes", the quantitative requirement determination unit 201 returns the determination result that "the quantitative requirements QC' is unsatisfiable" to the configuration information concretizing unit 101 (step S1206), and the process ends.

If the response to query Qf (CL) is "No", the process moves to step S1202.

If the response to query Qs (CL) and the response to query Qf (CL) are both "No", then the satisfiability of the quantitative requirements QC' is not evident in the response from the satisfiability information storage unit 202. This is a case where the satisfiability of the quantitative requirements QC' is unknown in the response from the satisfiability information storage unit 202.

In this case, in step S1202, the quantitative requirement determination unit 201 inputs the quantitative requirements QC' to the quantitative requirement verification unit 103, and requires the quantitative requirement verification unit 103 to verify whether or not the value assignment to variables that satisfies the quantitative requirements QC' exists. Then, the quantitative requirement verification unit 103 verifies whether or not there is the value assignment to variables that satisfies the quantitative requirements QC', as requested by the quantitative requirement determination unit 201, and the quantitative requirement determination unit 201 obtains the verification result from the quantitative requirement verification unit 103.

Next, the quantitative requirement determination unit 201 causes the pair of quantitative requirements QC' and the verification result obtained in step S1202 to be stored in the satisfiability information storage unit 202 (step S1203).

Next, the quantitative requirement determination unit 201 returns the verification result obtained in step S1202 to the configuration information concretizing unit 101 (step S1204), and the process ends.

In the second example embodiment, the configuration information concretizing unit 101, the quantitative requirement determination unit 201, the satisfiability information storage unit 202, and the quantitative requirement verification unit 103 are realized, for example, by a CPU of a computer operating in accordance with a system configuration derivation program. For example, the CPU may read a system configuration derivation program from a program recording medium such as a program storage device of the computer, and operate as the configuration information concretizing unit 101, the quantitative requirement determination unit 201, the satisfiability information storage unit 202, and the quantitative requirement verification unit 103 in accordance with the system configuration derivation program.

In the second example embodiment, the same effect is achieved as in the first example embodiment. Furthermore, in the second example embodiment, the satisfiability information storage unit 202 reuses the verification result of the quantitative requirements by the quantitative requirement verification unit 103 and returns the response to the query to the quantitative requirement determination unit 201. Then, if the response from the satisfiability information storage unit 202 does not reveal the satisfiability of the quantitative requirements, the quantitative requirement determination unit 201 causes the quantitative requirement verification unit 103 to perform the verification of the satisfiability of the quantitative requirements.

Here, the process of deriving a response to a query by the satisfiability information storage unit 202 can be performed by matching constraint expressions list included in a given query with the information stored by the satisfiability information storage unit 202. Therefore, this process can be realized faster than the verification process by the quantitative requirement verification unit 103 (see FIG. 14). Therefore, according to the second example embodiment, a concrete configuration that satisfies the quantitative requirements can be derived more rapidly.

Next, examples of abstract configuration and quantitative requirements input manner and concrete configuration output manner in each example embodiment of the present invention are described below.

Figure 18:
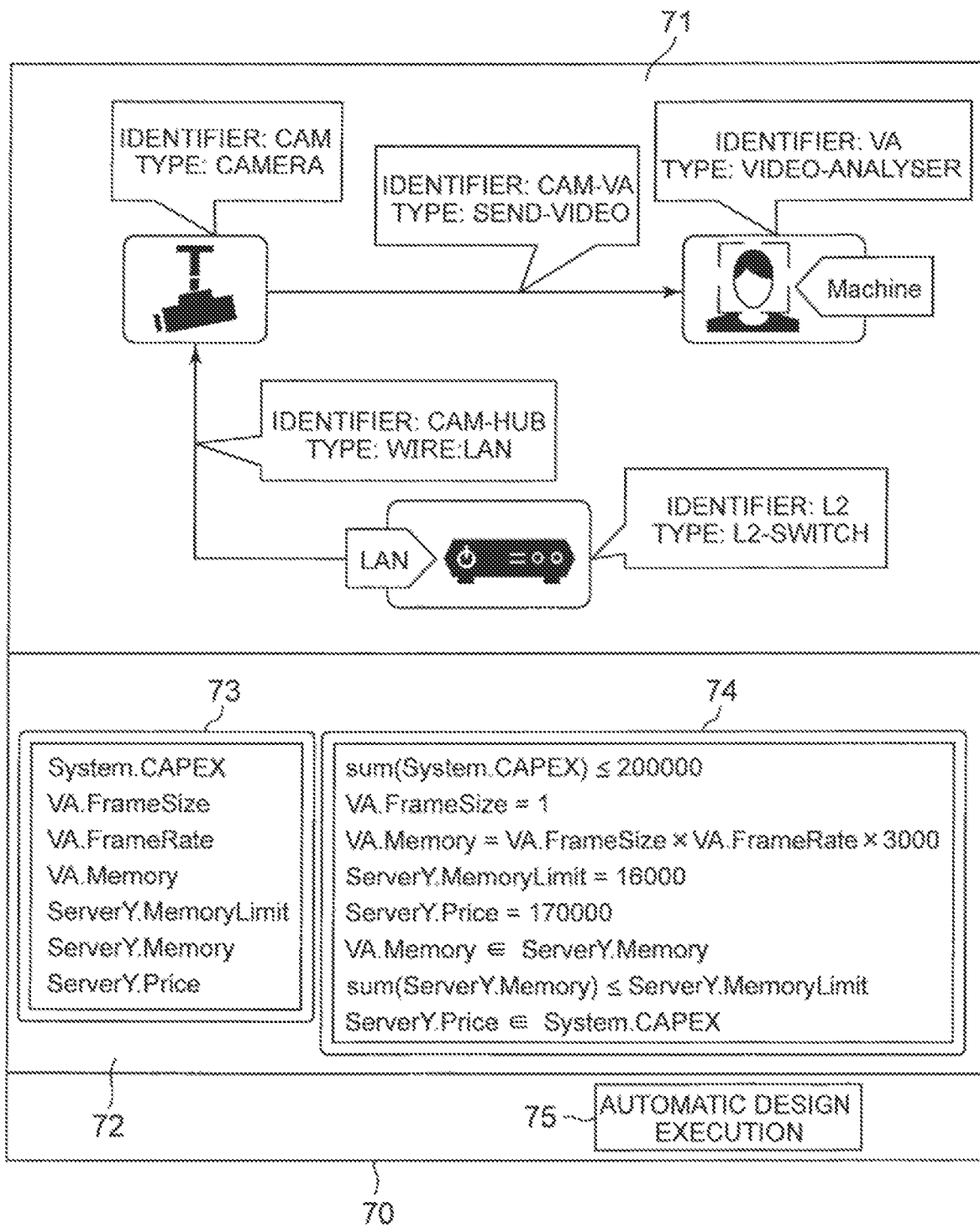
FIG. 18 It depicts an illustration showing an example of an input screen for an abstract configuration and quantitative requirements in each example embodiment.

FIG. 18 is an illustration showing an example of an input screen for an abstract configuration and quantitative requirements in each example embodiment. The configuration information concretizing unit 101 causes a display device (not shown in FIG. 5 and FIG. 16) to display an input screen 70. The input screen 70 includes a first input area 71, a second input area 72, and a button 75.

The first input region 71 is a region for inputting an abstract configuration. In the first input region 71, an input device such as a mouse or keyboard (not shown in FIG. 5 and FIG. 16) and a Graphical User Interface (GUI) can draw nodes including an icon, edges connecting between nodes, and entity callouts. It is also possible to describe entity identifiers and type information in the callouts by using an input device such as a keyboard or mouse. As the operator draws the nodes, edges, callouts, etc., a graph representing the abstract configuration is drawn in the first input area 71.

The configuration information concretizing unit 101 obtains the input abstract configuration as a graph drawn in the first input area 71.

The second input region 72 is an area for inputting quantitative requirements. The second input region 72 includes a first text box 73 for inputting a used variables list, and a second text box 74 for inputting a constraint expressions list.

In the first text box 73, a used variables list is input as text data by an input device such as a mouse or keyboard. Also, in the second text box 74, a constraint expressions list is input as text data by an input device such as a mouse or keyboard.

By being input text data corresponding to the used variables list in the first text box 73 and text data corresponding to the constraint expressions list in the second text box 74, the configuration information concretizing unit 101 obtains the quantitative requirements (quantitative requirements where some values are not yet determined) as text data.

The configuration information concretizing unit 101 obtains the abstract configuration input as a graph in the first input region 71, and the quantitative requirements input as text data in the second input region 72, at the time the button 75 is clicked by the mouse, and the system configuration derivation device of each example embodiment may start operating of each example embodiment.

The above example describes a case where the configuration information concretizing unit 101 obtains an abstract configuration input as a graph in the first input region 71 and quantitative requirements input as text data in the second input region 72. The manner of inputting the abstract configuration and quantitative requirements is not limited to the above examples. For example, the abstract configuration and quantitative requirements may be described in a file, and the file may be recorded on a data recording medium such as an optical disk. Then, in each example embodiment, the system configuration derivation device may be equipped with a data reading device (not shown) that reads data recorded on a data recording medium, the data reading device may read the file describing the abstract configuration and quantitative requirements from the data recording medium, and the configuration information concretizing unit 101 may obtain the file.

Figure 19:
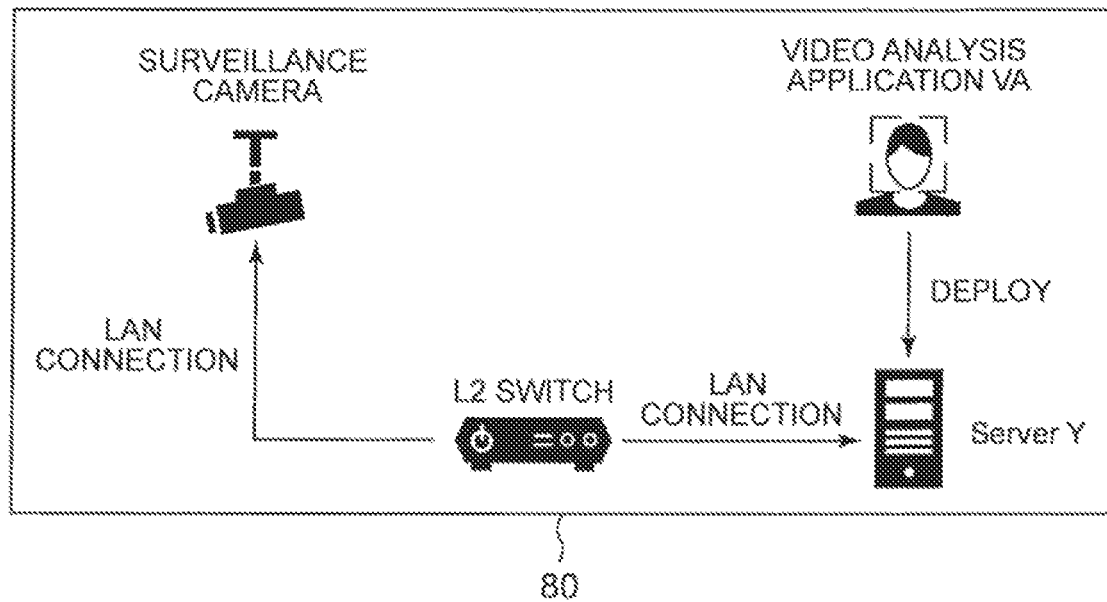
FIG. 19 It depicts an illustration showing an example of an output screen of a concrete configuration in a system configuration derivation device of each example embodiment.

FIG. 19 is an illustration showing an example of an output screen of a concrete configuration in the system configuration derivation device of each example embodiment. After deriving the concrete configuration, the configuration information concretizing unit 101 may display an output screen 80 representing the concrete configuration as a graph on the display device, as illustrated in FIG. 19.

Example Embodiment 3

Figure 20:
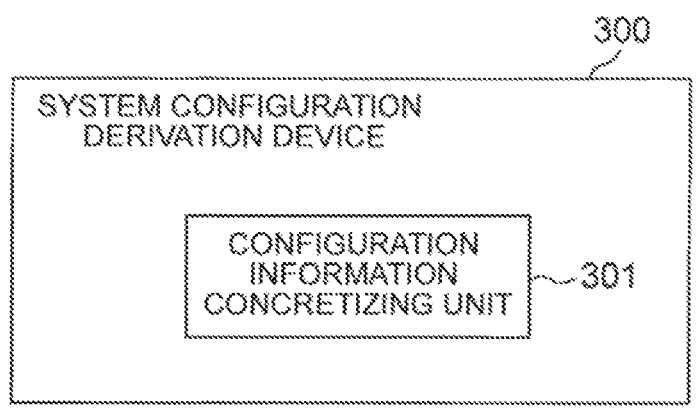
FIG. 20 It depicts a block diagram showing an example of a system configuration derivation device of a third example embodiment of the present invention.

FIG. 20 is a block diagram illustrating an example of a system configuration derivation device of a third example embodiment of the present invention. The system configuration derivation device 300 of the third example embodiment is equipped with a configuration information concretizing unit 301.

The configuration information concretizing unit 301 (e.g., corresponding to the configuration information concretizing unit 101) obtains as input an abstract configuration, which is information indicating a system configuration in which an undetermined part exists, and quantitative requirements, which are numerical requirements required for a system, and in which some numerical values are undetermined. The configuration information concretizing unit 301 outputs a concrete configuration, which is information indicating the system configuration in which an undetermined part does not exist, and which meets the quantitative requirements.

With such a configuration, the system configuration derivation device, when given an abstract configuration, and quantitative requirements in which some numerical values are undetermined, is capable of outputting a concrete system configuration concretizing the abstract configuration, the concrete system configuration meets quantitative requirements representing conditions and the like necessary for the operation of a desired system and including given quantitative requirements.

The system configuration derivation device may include a concretizing rule storage unit (e.g., corresponding to the concretizing rule storage unit 102) that stores concretizing rules which are rules for concretizing the abstract configuration and updating the quantitative requirements. The configuration information concretizing unit 301 may update the quantitative requirements in a step-by-step manner, and concretize the abstract configuration in a step-by-step manner to meet the quantitative requirements, based on the concretizing rules.

In addition, the configuration information concretizing unit 301 may determine a pair of input abstract configuration and input quantitative requirements as a root of a search tree. The configuration information concretizing unit 301 may derive the concrete configuration by repeating adding a new pair of a new abstract configuration and new quantitative requirements obtained based on the concretizing rules to the search tree as a child node in case values which meet the new quantitative requirements in the pair exist.

The system configuration derivation device may include a quantitative requirement verification unit (e.g., corresponding to the quantitative requirement verification unit 103) that verifies, when given quantitative requirements, whether or not there is a value assignment that meets the quantitative requirements. The configuration information concretizing unit 301 may inquire whether or not there is a value assignment that meets the new quantitative requirements of the quantitative requirement verification unit by giving the quantitative requirement verification unit the new quantitative requirements.

The system configuration derivation device may include a quantitative requirement verification unit (e.g., corresponding to the quantitative requirement verification unit 103), a satisfiability information storage unit (e.g., corresponding to the satisfiability information storage unit 202), and a quantitative requirement determination unit (e.g., corresponding to the quantitative requirement determination unit 201). The quantitative requirement verification unit verifies, when given quantitative requirements, whether or not there is a value assignment that meets the quantitative requirements. The satisfiability information storage unit stores pairs of the quantitative requirements given to the quantitative requirement verification unit and verification result, and responds to a query about whether or not there is a value assignment that meets the new quantitative requirements based on stored pairs. The quantitative requirement determination unit, when given the new quantitative requirements by the configuration information concretizing unit 301, queries about whether or not there is a value assignment that meets the new quantitative requirements to the satisfiability information storage unit, and inquires whether or not there is the value assignment that meets the new quantitative requirements of the quantitative requirement verification unit by giving the quantitative requirement verification unit the new quantitative requirements when a respond that whether or not there is the value assignment that meets the new quantitative requirements is unknown is obtained from the satisfiability information storage unit.

The configuration information concretizing unit 301 may be configured to obtain the abstract configuration as input as a drawn graph and the quantitative requirements as input as text data and, outputs the concrete configuration as a graph.

Figure 21:
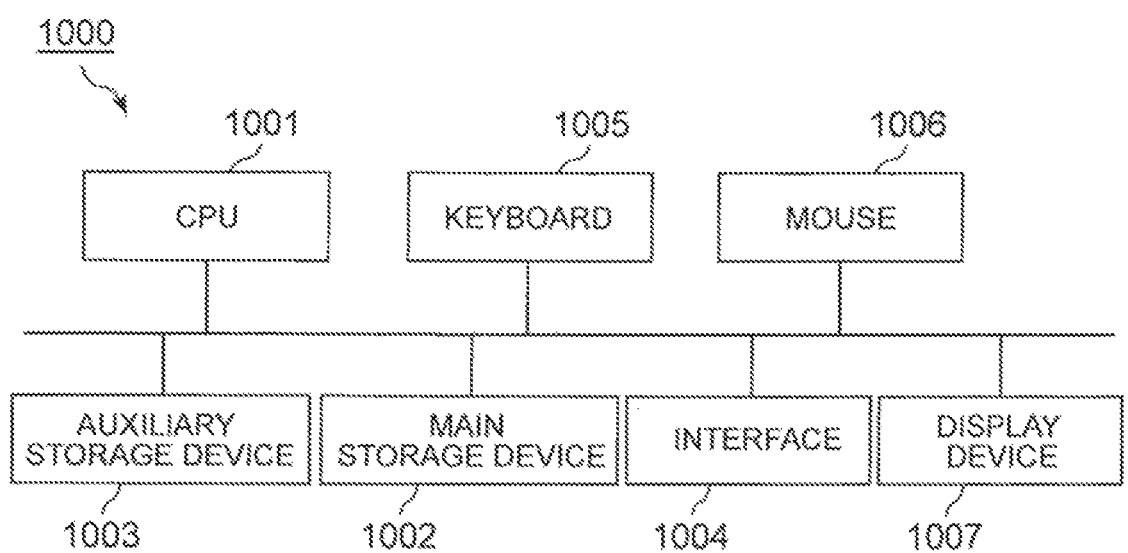
FIG. 21 It depicts a schematic block diagram showing an example of a computer configuration for a system configuration derivation device of each example embodiment of the present invention.

FIG. 21 is a schematic block diagram showing an example of a computer configuration for the system configuration derivation device of each example embodiment of the present invention. The computer 1000 includes a CPU 1001, a main storage device 1002, an auxiliary storage device 1003, an interface 1004, a keyboard 1005, a mouse 1006, and a display device 1007.

The system configuration derivation device of each example embodiment of the present invention is realized by a computer 1000. The operation of the system configuration derivation device is stored in the auxiliary storage device 1003 in the form of a program (system configuration derivation program). The CPU 1001 reads the program from the auxiliary storage device 1003 and expands it in the main storage device 1002, and in accordance with the program, The CPU 1001 executes the processing described in each of the aforementioned example embodiments.

The auxiliary storage device 1003 is an example of a non-temporary, tangible medium. Other examples of non-temporary tangible media are magnetic disks, magneto-optical disks, CD-ROM (Compact Disk Read Only Memory), DVD-ROM (Digital Versatile Disk Read Only Memory), semiconductor memory, and the like connected via the interface 1004. If the program is delivered to the computer 1000 by a communication line, the computer 1000 receiving the delivery may expand the program to the main storage device 1002 and perform the processing described in the above example embodiments in accordance with the program.

Also, some or all of each component may be realized by general-purpose or dedicated circuitry, processors, or a combination of these. They may be configured by a single chip or by multiple chips connected via a bus. Some or all of each component may be realized by a combination of the above-mentioned circuits, and programs.

When some or all of each component is realized by a plurality of information processing devices, circuits and the like, the plurality of information processing devices, circuits and the like may be provided in a focused or distributed manner. For example, the information processing devices and circuits may be realized as a client-and-server system, a cloud computing system, and so on, each of which is connected via a communication network.

As mentioned above, PTL 1 describes a system configuration derivation device having a function to convert an input abstract configuration into concrete system configuration information.

However, PTL 1 does not describe a technique for concretizing an abstract configuration while at the same time ensuring that the result of the concretization also meets quantitative requirements.

In addition, graphs in techniques described in NPL 1 are not suitable for representing quantitative requirements because they are merely graphs labeled with pre-defined type information. While it is not impossible to apply a similar representation to graphs as the way computers represent integers and decimals in bit representations, it is not practical in the case of representing thousands or tens of thousands of numbers as set values.

In addition, not all quantitative requirements are given in a determined state. In some cases, quantitative requirements may be given with some values undetermined. For example, quantitative requirements may be given with the frame size value determined, but the frame rate value is undetermined. In such cases, it is desirable to concretize the abstract configuration and at the same time, the result of the concretization should meet the quantitative requirements.

According to the present invention, the present invention, when given an abstract configuration, and quantitative requirements in which some numerical values are undetermined, is capable of outputting a concrete system configuration concretizing the abstract configuration, the concrete system configuration meets quantitative requirements representing conditions and the like necessary for the operation of a desired system and including given quantitative requirements.

The present invention is suitably applicable to a system configuration derivation device that derives a concrete configuration based on an abstract configuration.

While the invention has been particularly shown and described with reference to example embodiments thereof, the invention is not limited to these embodiments. It will be understood by those of ordinary skill in the art that various changes in form and details may be made therein without departing from the spirit and scope of the present invention as defined by the claims.

REFERENCE SIGNS LIST 100, 200 System configuration derivation device
101 Configuration information concretizing unit
102 Concretizing rule storage unit
103 Quantitative requirement verification unit
201 Quantitative requirement determination unit
202 Satisfiability information storage unit

What is claimed is:

1. A system configuration derivation device configured to:
obtain as input an abstract configuration, which is information indicating a system configuration in which an undetermined part exists, and quantitative requirements, which are numerical requirements required for a system, and in which at least one of a plurality of numerical values is undetermined; and
output a concrete configuration, which is information indicating the system configuration in which an undetermined part does not exist, and which meets the quantitative requirements,
wherein the system configuration derivation device comprises a concretizing rule storage unit, implemented by a storage device, and that stores concretizing rules which are rules for concretizing the abstract configuration and updating the quantitative requirements, and
wherein the system configuration derivation device is configured to:
update the quantitative requirements in a step-by-step manner, and concretize the abstract configuration in a step-by-step manner to meet the quantitative requirements, based on the concretizing rules;
determine a pair of input abstract configuration and input quantitative requirements as a root of a search tree; and
derive the concrete configuration by repeating adding a new pair of a new abstract configuration and new quantitative requirements obtained based on the concretizing rules to the search tree as a child node in case values which meet the new quantitative requirements in the pair exist,
wherein the system configuration derivation device further comprises a quantitative requirement verification unit, implemented by a processor, and that verifies, when given quantitative requirements, whether or not there is a value assignment that meets the quantitative requirements, and
wherein the system configuration derivation device is further configured to inquire whether or not there is a value assignment that meets the new quantitative requirements of the quantitative requirement verification unit by giving the quantitative requirement verification unit the new quantitative requirements,
wherein the quantitative requirements are defined in expressions with parameters, such that each expression of the expressions defines a single value to a parameter of the parameters or defines a relationship among two or more parameters of the parameters, and
wherein the quantitative requirement verification unit calculates values of the parameters that satisfy the input quantitative requirements defined in the expressions.

2. The system configuration derivation device according to claim 1,
wherein the system configuration derivation device is configured to obtain the abstract configuration as input as a drawn graph and the quantitative requirements as input as text data and, output the concrete configuration as a graph.

3. A system configuration derivation method comprising:
obtaining as input an abstract configuration, which is information indicating a system configuration in which an undetermined part exists, and quantitative requirements, which are numerical requirements required for a system, and in which at least one of a plurality of numerical values is undetermined; and
outputting a concrete configuration, which is information indicating the system configuration in which an undetermined part does not exist, and which meets the quantitative requirements,
wherein the system configuration derivation method further comprises:
updating the quantitative requirements in a step-by-step manner, and concretizing the abstract configuration in a step-by-step manner to meet the quantitative requirements, based on the concretizing rules which are rules for concretizing the abstract configuration and updating the quantitative requirements;
determining a pair of input abstract configuration and input quantitative requirements as a root of a search tree; and
deriving the concrete configuration by repeating adding a new pair of a new abstract configuration and new quantitative requirements obtained based on the concretizing rules to the search tree as a child node in case values which meet the new quantitative requirements in the pair exist,
wherein the system configuration derivation method further comprises:
verifying whether or not there is a value assignment that meets the quantitative requirements obtained as input; and
inquiring whether or not there is a value assignment that meets the new quantitative requirements obtained based on the concretizing rules,
wherein the quantitative requirements are defined in expressions with parameters, such that each expression of the expressions defines a single value to a parameter of the parameters or defines a relationship among two or more parameters of the parameters, and
verifying whether or not there is a value assignment that meets the quantitative requirements includes calculating values of the parameters that satisfy the input quantitative requirements defined in expression.

4. A non-transitory computer-readable recording medium in which a system configuration derivation program is recorded, the system configuration derivation program causing a computer to execute:

a configuration information concretizing process of obtaining as input an abstract configuration, which is information indicating a system configuration in which an undetermined part exists, and quantitative requirements, which are numerical requirements required for a system, and in which at least one of a plurality of numerical values is undetermined, and outputting a concrete configuration, which is information indicating the system configuration in which an undetermined part does not exist, and which meets the quantitative requirements;

in the configuration information concretizing process, updating the quantitative requirements in a step-by-step manner, and concretizing the abstract configuration in a step-by-step manner to meet the quantitative requirements, based on the concretizing rules which are rules for concretizing the abstract configuration and updating the quantitative requirements;

in the configuration information concretizing process, determining a pair of input abstract configuration and input quantitative requirements as a root of a search tree; and deriving the concrete configuration by repeating adding a new pair of a new abstract configuration and new quantitative requirements obtained based on the concretizing rules to the search tree as a child node in case values which meet the new quantitative requirements in the pair exist, in the configuration information concretizing process,
verifying whether or not there is a value assignment that meets the quantitative requirements obtained as input; and
inquiring whether or not there is a value assignment that meets the new quantitative requirements obtained based on the concretizing rules, wherein the quantitative requirements are defined in expressions with parameters, such that each expression of the expressions defines a single value to a parameter of the parameters or defines a relationship among two or more parameters of the parameters, and verifying whether or not there is a value assignment that meets the quantitative requirements includes calculating values of the parameters that satisfy the input quantitative requirements defined in expression.

* * * * *